(12) United States Patent
Koenig, Jr. et al.

(10) Patent No.: US 8,591,774 B2
(45) Date of Patent: Nov. 26, 2013

(54) METHODS FOR PREPARING MATERIALS FOR LITHIUM ION BATTERIES

(75) Inventors: Gary M. Koenig, Jr., Darien, IL (US); Ilias Belharouak, Bolingbrook, IL (US); Khalil Amine, Oak Brook, IL (US); Haixia Deng, Fremont, CA (US)

(73) Assignee: UChicago Argonne, LLC, Chicago, IL (US)

( * ) Notice: Subject to any disclaimer, the term of this patent is extended or adjusted under 35 U.S.C. 154(b) by 308 days.

(21) Appl. No.: 12/895,349

(22) Filed: Sep. 30, 2010

(65) Prior Publication Data

US 2012/0080649 A1    Apr. 5, 2012

(51) Int. Cl.
    *H01B 1/02*    (2006.01)
(52) U.S. Cl.
    USPC .................... 252/519.1; 252/521.2
(58) Field of Classification Search
    USPC .................... 252/500, 519.1, 521.2
    See application file for complete search history.

(56) References Cited

U.S. PATENT DOCUMENTS

| | | | |
|---|---|---|---|
| 7,344,773 B2 | 3/2008 | Subramanya et al. | |
| 2006/0105239 A1* | 5/2006 | Paulsen et al. | 429/231.3 |
| 2006/0199886 A1* | 9/2006 | Ryang | 524/262 |
| 2007/0111098 A1 | 5/2007 | Yang Kook et al. | |
| 2008/0095852 A1 | 4/2008 | Kong et al. | |
| 2008/0160410 A1 | 7/2008 | Sun et al. | |
| 2009/0068561 A1 | 3/2009 | Sun et al. | |
| 2009/0272939 A1 | 11/2009 | Sun et al. | |
| 2010/0034728 A1 | 2/2010 | Seo et al. | |

FOREIGN PATENT DOCUMENTS

| | | |
|---|---|---|
| WO | WO-2006/070977 A1 | 7/2006 |
| WO | WO-2006/104367 A3 | 10/2006 |
| WO | WO-2008/069351 A1 | 6/2008 |

OTHER PUBLICATIONS

Koenig et al., "Model for the Fabrication of Tailored Materials for Lithium-Ion Batteries", IPGD Meeting; Argonne National Laboratory, Jul. 6, 2010, 12 pps.

* cited by examiner

*Primary Examiner* — Mark Kopec
*Assistant Examiner* — William Young
(74) *Attorney, Agent, or Firm* — Foley & Lardner LLP

(57) ABSTRACT

A process for preparing transition metal particles with a gradient in composition from the core of the particle to the outer layers. In particular, the process involves contacting a first transition metal solution with a second transition metal solution to form a transition metal source solution under specific process conditions. The transition metal particles with desired composition gradients are precipitated from the transition metal source solution. The transition metal particles may be combined with metals such as lithium to form cathode active metal oxides.

19 Claims, 27 Drawing Sheets

A

B

| Point | %Mn |
|---|---|
| 1 | 27.1 |
| 2 | 52.5 |
| 3 | 64.1 |
| 4 | 62.1 |

A

B

A

B

METHODS FOR PREPARING MATERIALS FOR LITHIUM ION BATTERIES

GOVERNMENT INTERESTS

The United States Government has rights in this invention pursuant to Contract No. DE-ACO2-06CH11357 between the United States Government and UChicago Argonne, LLC, representing Argonne National Laboratory.

FIELD

The technology generally relates to the production of particles that can be used for the production of cathodes for lithium-ion batteries.

BACKGROUND

Lithium-ion batteries have enjoyed commercial success over the last 20 years as the dominant technology for energy storage in consumer electronics. In recent years, an increase in global energy demand, rising and fluctuating crude oil prices, and environmental concerns have led to an increase in demand for lithium-ion batteries. In particular, lithium-ion battery technology is being developed for applications in hybrid and electric vehicles. For vehicle applications, the materials that comprise the cathode materials in lithium-ion batteries must provide high capacity, high power, improved safety, long calendar lifetimes, thermal stability, low cost, and low toxicity. Generally, cathode materials for lithium-ion batteries that are currently on the market are unable to meet all the requirements for vehicular applications.

The energy-storage component of a lithium-ion battery cathode includes solid, micrometer-sized particles. These particles are typically of the composition $LiMO_2$, where M refers to a variety of transition metals both in isolation or in combination, commonly nickel (Ni), cobalt (Co), or manganese (Mn). $LiCoO_2$ is the most common commercial cathode material. However, the toxicity and high cost of Co has encouraged the development of other cathode materials with Ni or Mn.

SUMMARY

In one aspect, a process is provided including: contacting a first transition metal compound with a second transition metal compound to form a transition metal source solution; contacting the transition metal source solution with a precipitating agent to form a precursor solution; precipitating particles having a radius, the particles including: a transition metal oxide core; at least two layers of transition metal oxide; and where the particles have a transition metal concentration gradient in which the ratio of the first transition metal to the second transition metal is inversely proportional to the radius of the particle over at least a portion of the radius. In some embodiments, the contacting comprises stirring. In some embodiments, the transition metal of the first and second transition metal compounds include manganese (Mn), cobalt (Co), nickel (Ni), chromium (Cr), vanadium (V), aluminum (Al), zinc (Zn), sodium (Na), titanium (Ti), or iron (Fe). In some embodiments, the first and second transition metal compounds include, but are not limited to, metal sufates, nitrates, halides, acetates, or citrates. For example, the first and second transition metal compounds include, but are not limited to manganese sulfate, nickel sulfate, cobalt sulfate, manganese nitrate, nickel nitrate, or cobalt nitrate, as well as the metal chlorides, acetates, or citrates.

In other embodiments, the first transition metal compound includes Mn and the second transition metal compound includes Co; the first transition metal compound includes Mn and the second transition metal compound includes Ni; the first transition metal compound includes Co and the second transition metal compound includes Ni; the first transition metal compound includes Ni and the second transition metal compound includes Mn; the first transition metal compound includes Ni and the second transition metal compound includes Co; or the first transition metal compound includes Co and the second transition metal compound includes Ni.

In some embodiments, the precipitating agent comprises sodium carbonate, sodium hydroxide, or other metal carbonates or hydroxides. For example, other metal carbonates or hydroxides may include, but are not limited to, lithium or potassium carbonate or hydroxide may be used. In some embodiments, the process includes contacting the precursor solution with a chelating agent prior to precipitating. In some embodiments, the chelating agent includes ammonium hydroxide, hydrazine, or ethylenediaminetetracetic acid (EDTA). In some embodiments, the process of contacting a first transition metal compound with a second transition metal compound to form a transition metal source solution further includes contacting the transition metal source with a third transition metal compound. In some embodiments, the transition metal of the third transition metal compound includes manganese, cobalt, or nickel. In some embodiments, the third transition metal compound includes manganese sulfate, nickel sulfate, cobalt sulfate, manganese nitrate, nickel nitrate, or cobalt nitrate.

In some embodiments, the process of contacting includes dissolving the first transition metal compound in a solvent to form a first transition metal solution and dissolving the second transition metal compound in a solvent to form a second transition metal solution. In some embodiments, the concentration of the first transition metal in the first transition metal solution is from 0.001 M to 6 M. In some embodiments, the concentration of the second transition metal in the second transition metal solution is from 0.001 M to 6 M.

In some embodiments, the process includes feeding the first transition metal solution and the second transition metal solution into a reactor at a rate sufficient to provide a transition metal particles having a gradient concentration. In some embodiments, the rate sufficient to provide the gradient is from 0.001 L/hr to 50 L/hr.

In some embodiments, the radius of the particles is between 0.005 μm to 50 μm, or between 0.5 μm to 15 μm. In some embodiments, the solvent includes water, or alcohols. Illustrative alcohols may include, but are not limited to methanol, ethanol, propanol, butanol, etc. In some embodiments, the precipitating step is carried out a temperature between 20° C. to 100° C., or between 25° C. to 80° C. In some embodiments, the process includes collecting the particles.

In some embodiments, the process includes contacting the particles with lithium. For example, the lithium may be in the form of lithium metal, or as lithium carbonate, lithium nitrate, or lithium hydroxide. In some embodiments, the ratio of lithium to transition metal ranges from 0.5:1 to 1.5:1. In some embodiments, the process includes heating the particles at elevated temperature. In some embodiments, the particles are heated an elevated temperature between 100° C. to 1500° C., or between 300° C. to 1000° C. In some embodiments, the transition metal oxide core is Ni-rich and an outer most transition metal oxide layer is manganese-rich. In some embodiments, an electrochemical device is provided which includes a particle prepared by this process.

In another aspect, a transition metal oxide particle or a lithium transition metal oxide particle is provided with a radius of the particle defined by a core and two or more layers, where the particle has a gradient concentration along at least a portion of the radius and the core is concentrated in a first transition metal, and each successive layer has a lesser concentration of the first transition metal as the distance from the core increases. In some embodiments, the core is Ni-rich and an outermost layer of the particle is manganese-rich. In some embodiments, an electrochemical device includes the particle.

In another aspect, a system is provided including: a first container with a first transition metal solution; a second container with a second metal solution where the first container is mechanically connected to the second container such that the first transition metal solution can be introduced into the second container to form a transition metal source solution; a chamber mechanically connected to the second container such that the metal source solution can be fed into the chamber where the rate of change in the concentration of a component in the metal source solution is in accordance with the equation $$\frac{dC_{f1}}{dt} = \frac{Q_{f2}C_{f2} - Q_{f2}C_{f1}}{V_i + (Q_{f2} - Q_{f1})t}$$

wherein:
$C_{f1}$ is the concentration of the component being fed to the chamber;
$Q_{f1}$ is the flow rate of the transition metal source solution into the chamber;
$Q_{f2}$ is the flow rate from the first container to the second container;
$C_{f2}$ is the concentration of the component in the first transition metal compound;
$V_i$ is the initial volume of the solution that is fed to the precipitation chamber; and
t is time.

In such embodiments, the particles are precipitated from the metal source solution; and the concentration of the component in the particle is related to the concentration of a component in the metal source solution.

In another aspect, a method to control the composition of a particle is provided including: contacting a first transition metal compound with a second transition metal compound to form a transition metal source solution; adding the transition metal source solution into a chamber at a specific flow rate; contacting the transition metal source solution with a precipitating agent to form a precursor solution; precipitating from the precursor solution particles with a radius, the particles including: a transition metal oxide core and at least two layers of transition metal oxide where the particle has a gradient concentration of the first transition metal in comparison to the second transition metal is inversely related to the radius of the particle over at least a portion of the radius where the rate of change of the concentration of the second transition metal in the particle is in accordance with the equation I:

$$\frac{dC_0}{dt} = \frac{Q_{f1}(C_{f1} - 2C_0)}{V} \quad (I)$$

wherein:
$C_o$ is the concentration of a component in the particle,
$C_{f1}$ is the concentration of the transition metal source solution fed to the chamber,
$Q_{f1}$ is the flow rate of the transition metal source solution into the chamber, V is the volume of the transition metal source solution that is fed to the chamber.

In another aspect, a transition metal oxide material is provided which includes one or more particles each having a core and outer layers where the composition of a first component as compared to a second component in a layer of the particle increases with the distance of the layer from the core. In some embodiments, the composition of the second component as compared to a second component in a layer of the particle decreases with the distance of the layer from the core.

BRIEF DESCRIPTION OF THE DRAWINGS

FIG. 29 compares the concentration of manganese predicted with the ICP (inductively coupled plasma) data prepared according to Example 9.

DETAILED DESCRIPTION

A process is provided for preparing transition metal particles with a gradient in composition from the core of the particle to the outer layers. In particular, the process includes contacting a first transition metal compound with a second transition metal compound to form a transition metal source solution under specific process conditions. Particles with a desired composition gradient are precipitated from the transition metal source solution. The transition metal particles may be subsequently treated to produce metal oxide materials. In particular, the transition metal particles may be thermally treated with lithium to form lithiated metal oxide materials. The metal oxides may be used in the cathodes of lithium-ion batteries. The particles may be also combined with other metals such as, but not limited to, lithium, to form cathode active metal oxides. The metal oxides may be used in the preparation of electrodes for use in a wide variety of applications including, but not limited to, electrochemical cells, batteries, and super-capacitors.

In cathodes for lithium-ion batteries, materials that have high Ni content have high capacities. However, materials with high Ni content suffer from poor cycle life and high interfacial cell impedance due to oxygen release and high concentrations of unstable $Ni^{4+}$ ions. The Ni-rich materials are unable to meet the safety and calendar life requirements for lithium-ion batteries in automotive applications. Particles that are high in Mn, even when in combination with Ni, are more stable. In contrast, materials with high Mn content provide excellent cycle life and safety because they are much more stable when in contact with the battery electrolyte compared to Ni cathodes. Therefore, a particle that has a high Ni content in the interior portion for high capacity and has a high concentration of Mn at the outer layers for improved safety and stability may be suited for lithium-ion battery cathodes.

As used herein, the gradient in composition of a particle is a change in concentration of a particular component of the particle as a function of the distance of radius of the particle. For example, this may refer to a change in concentration of a particular metal component as the size of the particle changes. The core of a particle may have a relatively high concentration of a particular metal, however as the particle grows, the relative concentration becomes lower. Thus, a gradient in concentration of that particular metal is established over at least a portion of the radius. By at least a portion, it is meant that the concentration gradient may exist in the inner portions of the particle, however as the particle grows the concentration may be constant toward the outer reaches of the radius of the particle. In some embodiments, transition metal solutions are contacted by stirring.

Figure 1:
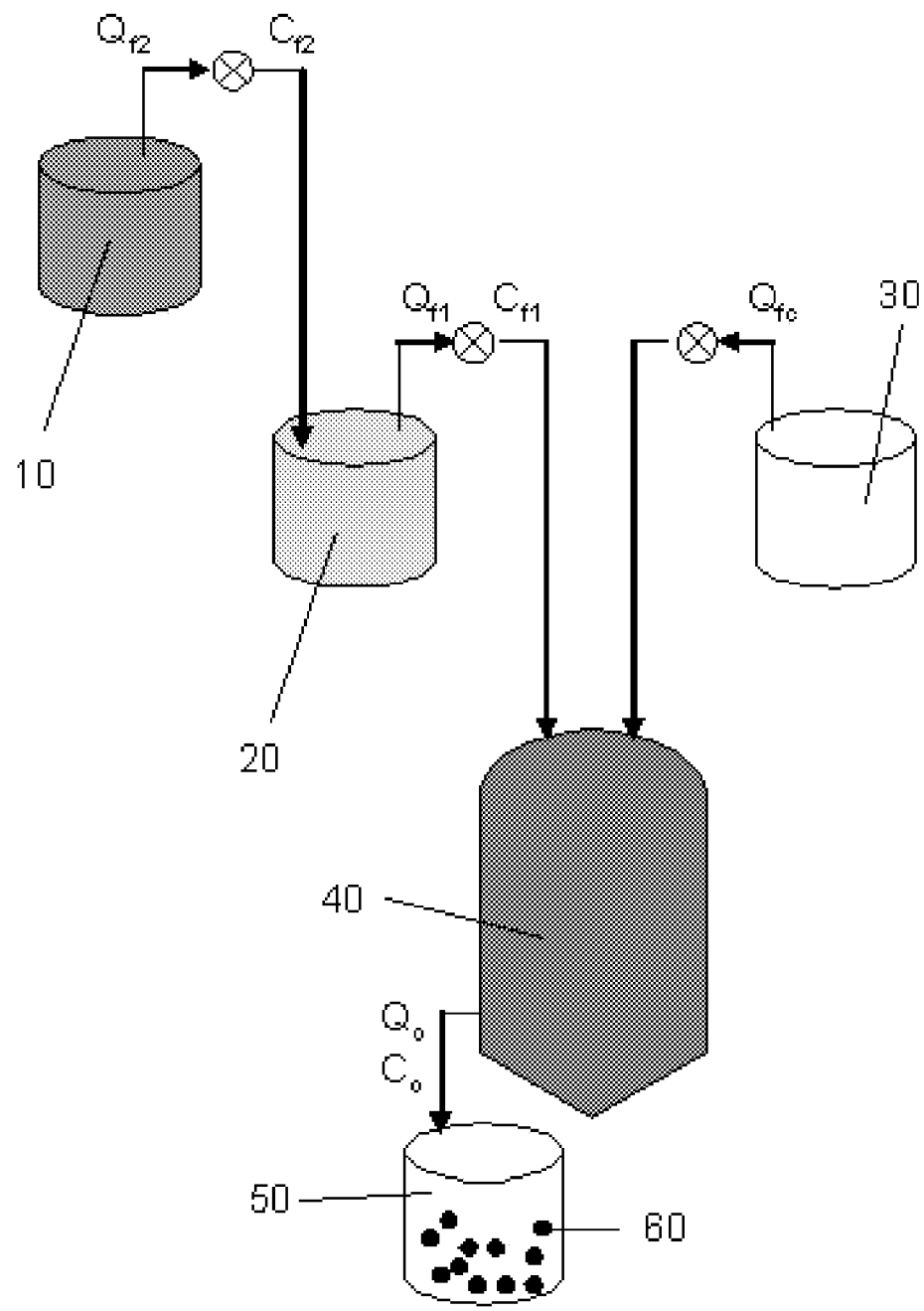
FIG. 1 is schematic of a system for the precipitation of transition metal particles for the cathodes of lithium-ion batteries, according to some embodiments.

FIG. 1 illustrates a system for preparing the gradient transition metal compounds. A first transition metal compound 10 is supplied to the second transition metal compound 20 to form a transition metal source solution in a reactor 40. To the reactor 40 is added a precipitating agent 30. The gradient particles 60 are collected in a vessel 50. The metal source solution is introduced into a chamber at a specific flow rate ($Q_{f1}$) and concentration ($C_{f1}$). Transition metal particles are precipitated from the metal source solution and leave the chamber at a flow rate ($Q_0$) and concentration ($C_0$).

In some embodiments, the first transition metal compound is a solution rich in manganese (Mn-rich solution) and the second metal compound is a solution rich in nickel (Ni-rich solution). A solution rich in a particular component such as Mn or Ni has a significant molar concentration of that component, greater than 50 mol %, of the transition metals present, not the total concentration.

The first and second transition metal compounds may include manganese (Mn), cobalt (Co), or nickel (Ni). The transition metal solutions are dissolved in water, in isolation or in combination, in concentration ranges of 0.001 to 6 M, but typically in the range of 1 to 2 M. The transition metal compound may include metal sulfates, nitrates, halides, acetates, or citrates. For example, the transition metal compound may include manganese sulfate, nickel sulfate, cobalt sulfate, manganese nitrate, nickel nitrate, and cobalt nitrate, or any of these metals as metal chlorides, acetates, or citrates.

In some embodiments, a precipitation agent is added to the transition metal source to form a precursor solution and particles are precipitated in a continuously stirred tank reactor ("reactor"). The precipitation agent may be chosen from, but is not limited to, sodium carbonate, sodium hydroxide, potassium carbonate, potassium hydroxide, lithium carbonate, or lithium hydroxide. Additionally, a chelating agent may be fed to the reactor, which includes, but is not limited to, ammonium hydroxide, hydrazine, or EDTA. The precipitation agent and the chelating agent may dissolved in water and fed into the reactor at concentrations between 0.001 and 6 M, or between 1 to 2 M for the precipitation agent and 0.001 to 2 M for the chelating agent. The temperature in the reactor should be sufficient for the precipitating agent and chelating agent to react sufficiently with the transition metal source solution. For example, the reactor temperature may range from 10 to 150° C., from 20° C. and 120° C., from 25° C. and 100° C., or from 25 to 80° C. The pH should be maintained may be set between 0 to 14, depending on the desired conditions for particle growth. Typically, the stirring speed in the reactor should be sufficient for the reaction and may vary between 0 to 5000 rotations per minute. The flow rates of solutions that are fed to the reactor are should be controlled for desired particle nucleation. The flow rates may be set between 0.001 to 50 liters per hour (L/hr).

In some embodiments, the particles are further processed to form transition metal oxides or lithiated transition metal oxides. The product from the reactor is solid particles dispersed in solution. The particle diameters may vary from 0.01 to 100 μm in size. In some embodiments, the particles have a diameter from 1 μm to 30 μm. Generally, the transition metal particles are roughly spherical but may have other shapes such as cylindrical, ellipses, etc.

In some embodiments, the particles are washed with water after precipitation to remove residual impurities, dried, and fired in a furnace. In some embodiments, the particles are combined with an alkali metal or an alkaline earth metal during the firing. For example, the metal may be lithium, sodium, potassium, calcium, or magnesium. In some embodiments, the metal is lithium. The furnace temperature is sufficient to cause insertion of the metal into the particle. For example, the temperature may range from 100° C. to 1500° C., from 300° C. to 1000° C., or from 350° C. to 750° C., according to various embodiments.

In one aspect, process conditions may be used to control the gradient in composition of the particles that are produced in the reactor. In some embodiments, the concentration of a species in the transition metal source solution that is added to the reactor correlates with the relative composition of that species in the resulting precipitating particle. In addition, changing the flow rate of the first transition metal solution into the second transition metal solution will impact the composition of the particles.

A molar balance around the second container can be used to determine the concentration of any species in the transition metal source solution entering the reactor as a function of time as shown below.

$$\frac{d(C_{f1}V)}{dt} = Q_{f2}C_{f2} - Q_{f1}C_{f1} \tag{1}$$

Definition of Variables:
$Q_{f1}$—Flow rate of the transition metal source solution into the reactor
$C_{f1}$—Concentration of a species entering the reactor
$Q_{f2}$—Flow rate of the first transition metal solution into the second transition metal solution
$C_{f2}$—Concentration of a species in the first transition metal solution
V—Total volume of the transition metal source solution entering the reactor
$V_i$—Initial volume of the second transition metal solution entering the reactor
$C_{f1,i}$—Initial concentration of the transition metal solution entering the reactor
t—time Equation 1 demonstrates that the change in the moles of a species in the second transition metal solution as a function of time is determined by the moles of that species coming in subtracted by the moles of that species going out. Using the product rule, the left side of equation 1 can be written as:

$$\frac{d(C_{f1}V)}{dt} = C_{f1}\frac{dV}{dt} + V\frac{dC_{f1}}{dt} \tag{2}$$

Equation 2 can be rewritten as:

$$V = V_i + (Q_{f2} - Q_{f1})t \tag{3}$$

$$\frac{dV}{dt} = Q_{f2} - Q_{f1} \tag{4}$$

Substitution of Equation 3 and Equation 4 into equation 2, yields the following expression:

$$\frac{dC_{f1}}{dt} = \frac{Q_{f2}C_{f2} - Q_{f2}C_{f1}}{V_i + (Q_{f2} - Q_{f1})t} \tag{5}$$

Equation 5 can be used to solve for the concentration of any species introduced into the reactor as a function of time In some embodiments, the flow rates ($Q_{f1}$, $Q_{f2}$) can be controlled. The concentration of species in the first metal solution ($C_{f2}$) can also be set to a desired amount. At the start of the process (t=0), V=$V_i$; and $C_{f1}$=$C_{f1,i}$. Thus, Equation 5 can be solved numerically by choosing a suitable time step and solving fr the concentration of any species of interest.

In addition, a molar balance around the reactor can be written to solve for the concentration of a species in the solution of particles ($C_o$) leaving the reactor as shown in FIG. 1. The equation for the change in moles of a species is given by:

$$\frac{d(C_oV)}{dt} = Q_{f1}C_{f1} - Q_oC_o \qquad (6)$$

Figure 29:
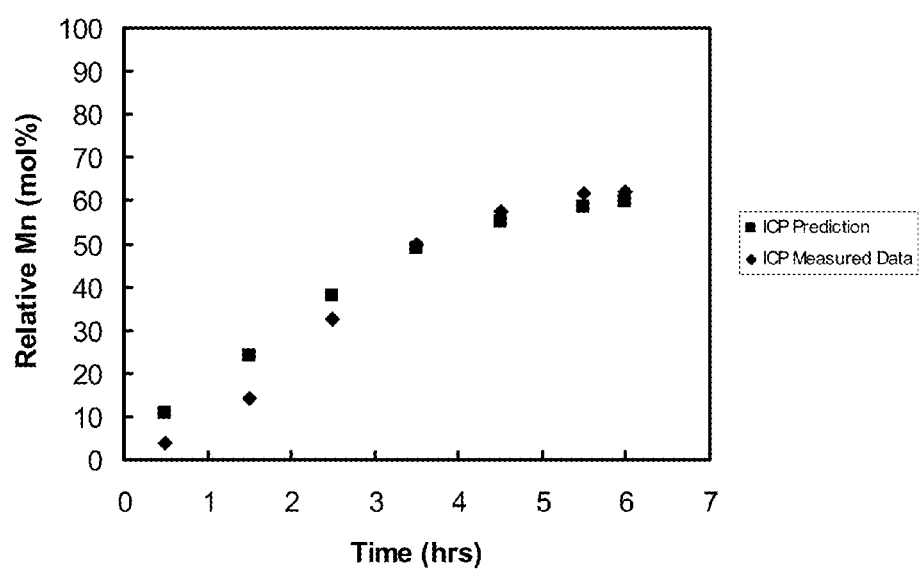
FIG. 29 is schematic of the system for precipitation of transition metal particles for the cathodes of lithium-ion batteries.
Figure 30:
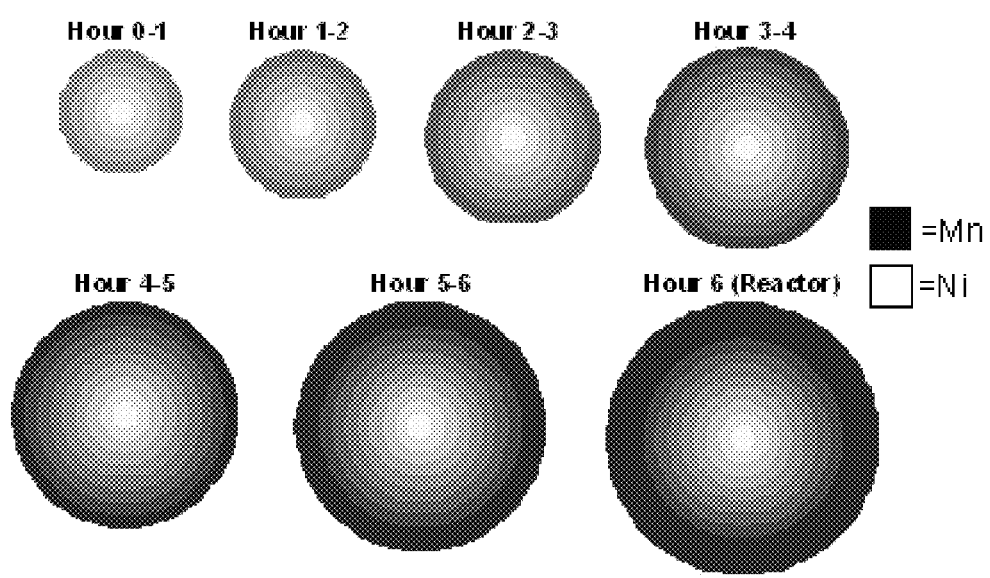
FIG. 30 shows a schematic of particle growth of the transition metal particles data prepared according to Example 9 for 6 hours, and corresponding to equation I. In particular, the concentration of manganese increases away from the core.
Figure 31:
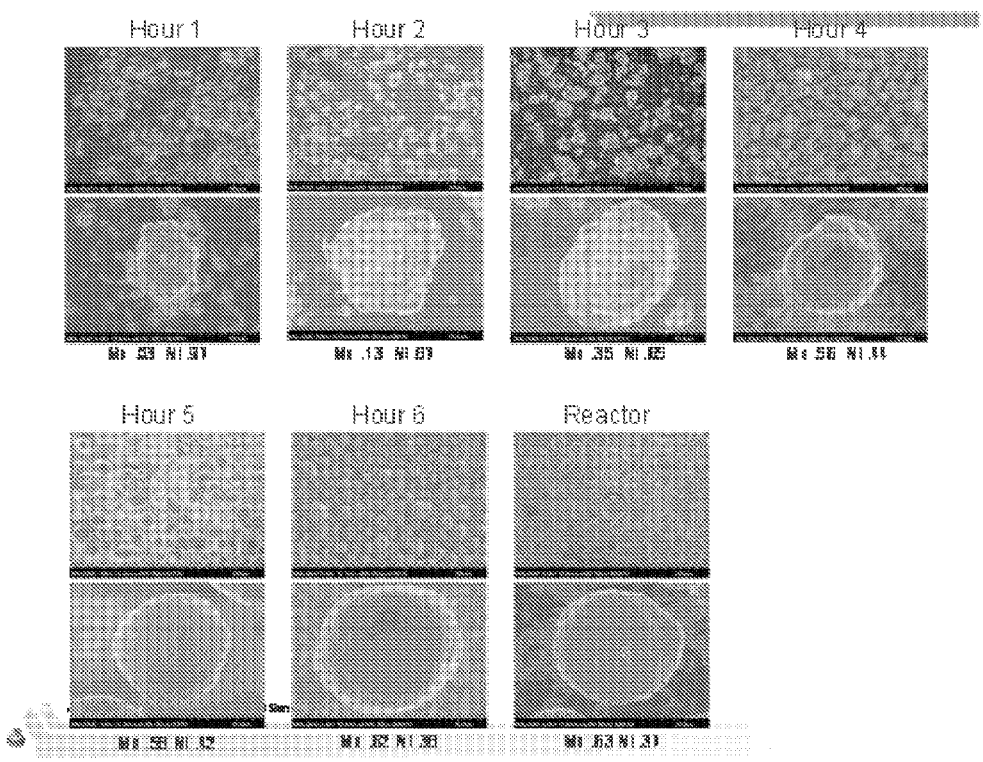
FIG. 31 shows SEM images of the particle growth of the transition metal particles data prepared according to Example 9 for 6 hours.
Figure 32:
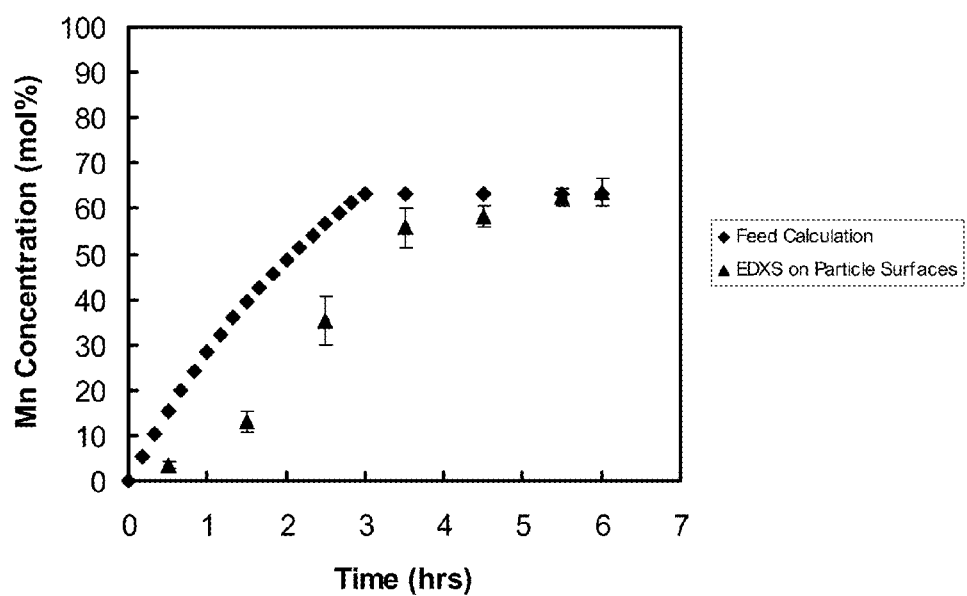
FIG. 32 compares the manganese concentration in the feed to the chamber as calculated with EDXS measurements made on the surface of the transition metal particles prepared according to Example 9 for 6 hours.

Here, the flow rate of the precipitated particles in solution is $Q_o$ and the volume of the transition metal solution entering the reactor is V. By entering the flow rates and volume of solution into Equation 6, the value of $C_o$ as a function of time can be obtained as shown in FIG. 29. FIG. 29 displays the predicted ICP concentration calculated using Equation 6 and the measured relative transition metal compositions of particles collected from the reactor at the indicated timepoints. In addition, the concentration of Mn in the particles can be measured using ICP data as shown in FIG. 29. The predicted concentration of Mn closely follow the actual data. It was observed that the average difference between the ICP prediction and measurement was 4.2%. The model of growth of the particles as shown in FIG. 30 show a Ni core and successively higher concentration of Mn in the outer layers. FIG. 31 shows the growth of particles over a 6-hour period. The result of the calculated concentration of Mn in the transition metal source solution entering the reactor is compared to EDXS measurements of Mn on particles show the same trend (see FIG. 32).

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology, thus generally described, will be understood more readily by reference to the following examples, which are provided by way of illustration and are not intended to be limiting.

EXAMPLES

General Procedures

The concentration profiles of the metal transition source solution into the reactor of nickel and manganese as a function of time were obtained under different process conditions. In all examples, the flow rate from the Ni-rich solution to the reactor ($Q_{f1}$) was kept constant at 1 L/hr. In practice, this flow rate could be set at any value and may vary with time. In all examples, the total molar concentration of both the Mn-rich and the Ni-rich solutions were 2 M. In practice, any concentration can be used and the concentration may vary with time. In all examples, the initial concentration ($C_{f,i}$) at the start of the process (t=0) was 100 mole percent (mol %) of Ni. In practice, any initial concentration can be used. In all examples, the flow rate from the Mn-rich solution to the Ni-rich solution was between 0.5 and 2 L/hr. In practice, any flow rate for the Mn-rich and Ni-rich can be used. In all examples, the volume of Ni-rich solution was 4 L. In practice, any volume can be used. In all examples, the concentration of the Mn-rich solution was between 50 and 100 mol %. In all examples, the process was carried out for 6 to 8 hours. In all examples, the Mn-rich solution was fed between 0 and 2 hours after the process was started and 4 L of Mn-rich solution was fed. In practice, the Mn-rich solution could be fed at any time and in any quantity.

Example 1

Figure 2:
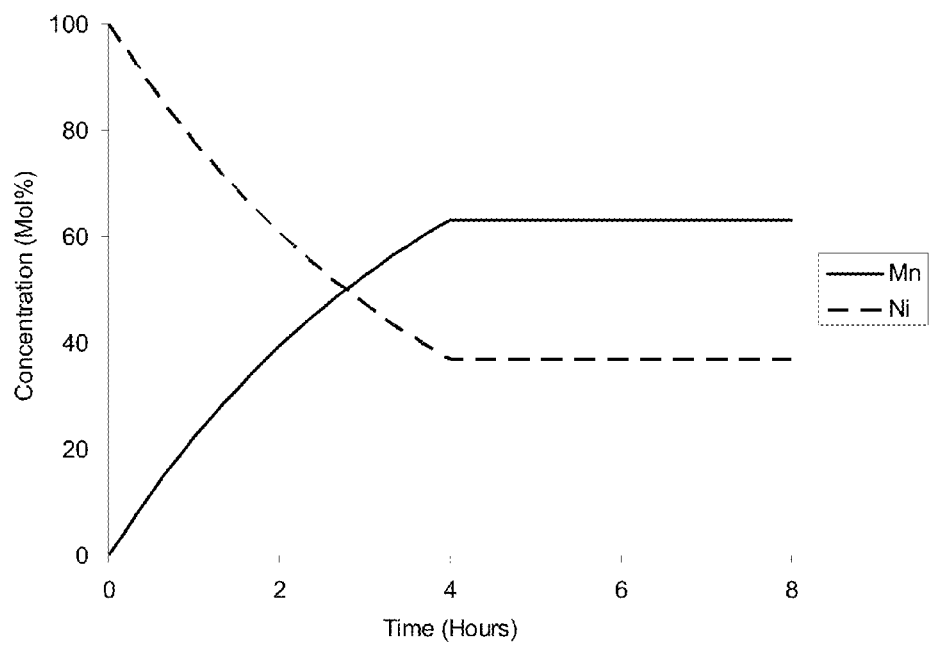
FIG. 2 is a graph of concentration (in mole percent) of manganese and nickel fed to the chamber as a function of time, according to Example 1.

Transition metal particles were produced under the following conditions: Four liters of Mn-rich solution of 100 mol % of Mn was fed at 1 L/hr for 4 hours and mixed with a Ni-rich solution composed of 100 mol % of Ni with an initial volume of 4 L. The concentration profile is shown in FIG. 2. The relative Ni concentration drops from 100 mol % to 36.8 mol %. Correspondingly, the Mn concentration increased from 0 mol % to 63.2 mol % over 4 hours. After 4 hours, a solution with a constant concentration of 36.8 mol % of Ni and 63.2 mol % of Mn was fed to the reactor for an additional 4 hours.

Example 2

Figure 3:
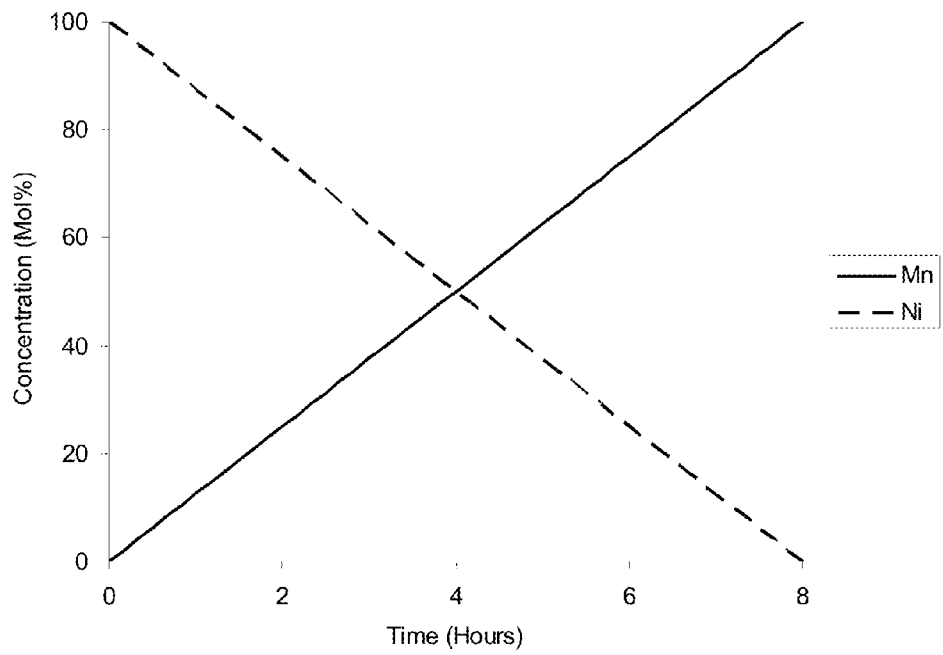
FIG. 3 is a graph of concentration (in mole percent) of manganese and nickel fed to the chamber as a function of time, according to Example 2.

The concentration of the metal source solution fed to the reactor as a function of time was determined when 4 L of 100 mol % of Mn in a Mn-rich solution was fed at 0.5 L/hr for 8 hours and mixed with a Ni-rich solution composed of 100 mol % of Ni with an initial volume of 4 L. The flow rate of the Mn-rich solution has been reduced by a half as compared to Example 1. The concentration profile is shown in FIG. 3. As the Ni concentration dropped from 100 mol % to 0.1 mol %, the Mn concentration increased from 0 mol % to 99.9 mol % over 8 hours.

Example 3

Figure 4:
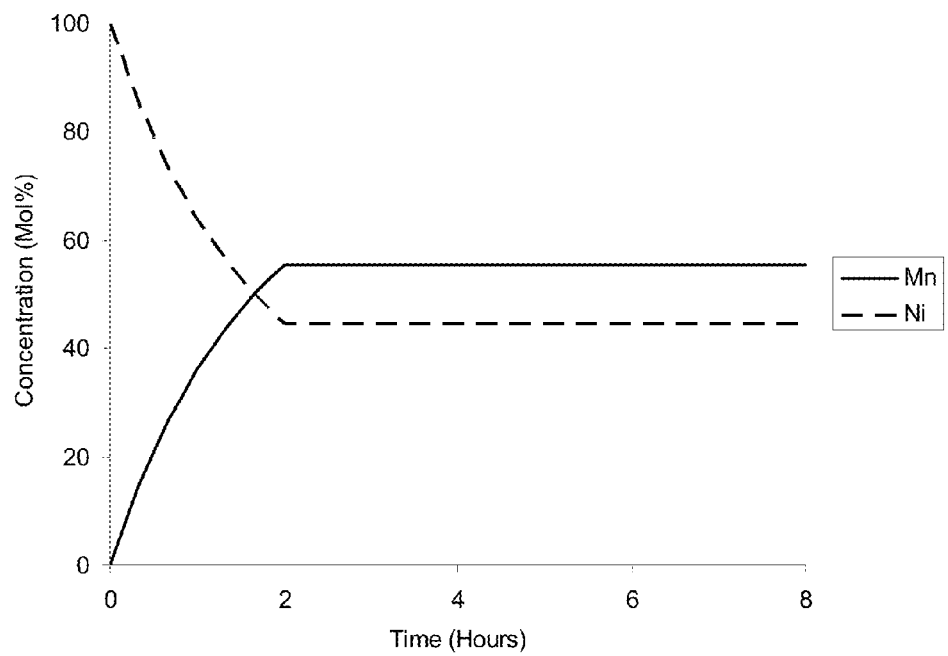
FIG. 4 is a graph of concentration (in mole percent) of manganese and nickel fed to the chamber as a function of time, according to Example 3.

The concentration of the feed to the reactor as a function of time was determined when 4 L of 100 mol % of Mn in a Mn-rich solution was fed at 2 L/hr for 2 hours and mixed with a Ni-rich solution composed of 100 mol % of Ni with an initial volume of 4 L. The flow rate of the Mn-rich solution has been doubled as compared to Example 1. The concentration profile is shown in FIG. 4. The relative Ni concentration dropped from 100 mol % to 44.4 mol %. Correspondingly, the Mn concentration increased from 0 mol % to 55.6 mol % over 2 hours. After 2 hours, a solution with a constant concentration of 44.4 mol % of Ni and 55.6 mol % of Mn was fed to the reactor for an additional 6 hours.

Example 4

Figure 5:
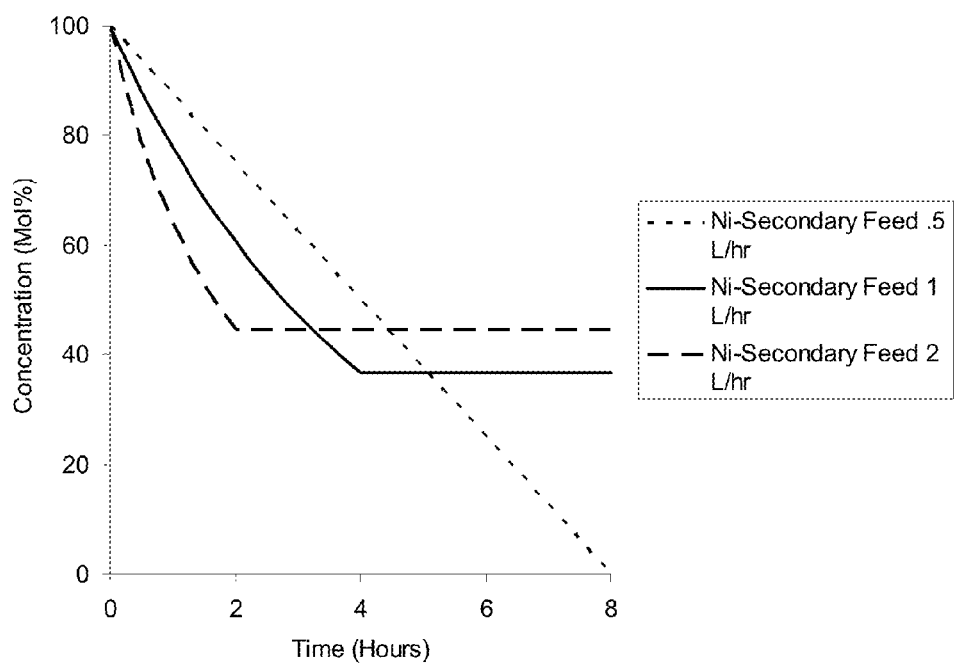
FIG. 5 is a graph of nickel concentration (in mole percent) fed to the chamber as a function of time for secondary Manganese-rich solution flow rates of 0.5, 1, and 2 L/hr ($Q_{f2}$), according to Example 4.

The concentration profiles for the Ni fed to the reactor in Examples 1, 2, and 3 are shown in FIG. 5. The final Ni concentration in the transition metal source solution was 0, 36.8, and 44.4 mol % for the three different flow rates for the Mn-rich solution, 0.5, 1, and 2 L/hr. Increasing the flow rate of the Mn-rich solution by a factor of four changed the Ni concentration in the reactor form 44.4 mol % to 0, even though total amount of Ni fed to the reactor remains constant. The Ni and Mn in the transition metal source solution gets incorporated into the precipitated particles and the gradient in composition in the particles can be tuned. For the Mn-rich solution flow rates of 0.5, 1, and 2 L/hr, the Ni composition decreases at a rate of 12.5, 15.8, and 27.8 mol %/hr. Thus, in Examples 1, 2 and 3, the gradient in the Ni concentration in the transition metal source solution fed to the reactor changes sharply when the flow rate of the Mn-rich solution is adjusted. Controlling the gradient in the composition is important for avoiding particle pulverization during cycling due to volume expansion mismatches between materials of different compositions. If, for example, a core of one composition and a shell of a different composition are grown without a gradient, the differences in the volume expansion between the core and shell can result in void regions between the two during cycling. A gradient in composition allows the differences in expansion to be diffused out over a greater distance to reduce the stress at an single point/plane/interface within the material.

Example 5

Figure 6:
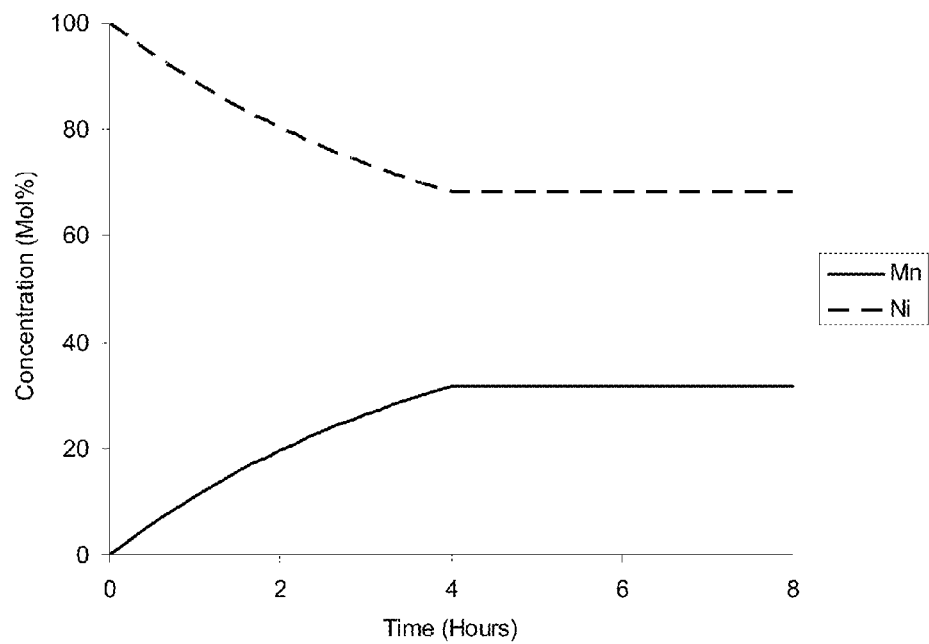
FIG. 6 is a graph of concentration (in mole percent) of manganese and nickel fed to the chamber as a function of time, according to Example 5.

The concentration of the transition metal source solution fed to the reactor as a function of time was determined when 4 L of 50 mol % of Mn and 50 mol % of Ni was fed at 1 L/hr for 4 hours and mixed with a Ni-rich solution composed of 100 mol % of Ni with an initial volume of 4 L. In contrast to Example 1, the concentration of the Mn-rich solution was halved 50 mol % of Mn as compared to 100 mol % of Mn. The concentration profile is shown in FIG. 6. The Ni concentration dropped from 100 mol % to 68.4 mol %. Correspondingly the Mn concentration increased from 0 mol % to 31.6 mol % over 4 hours. After 4 hours, a solution with a constant concentration of 68.4 mol % of Ni and 31.6 mol % of Mn was fed to the reactor for an additional 4 hours.

Example 6

Figure 7:
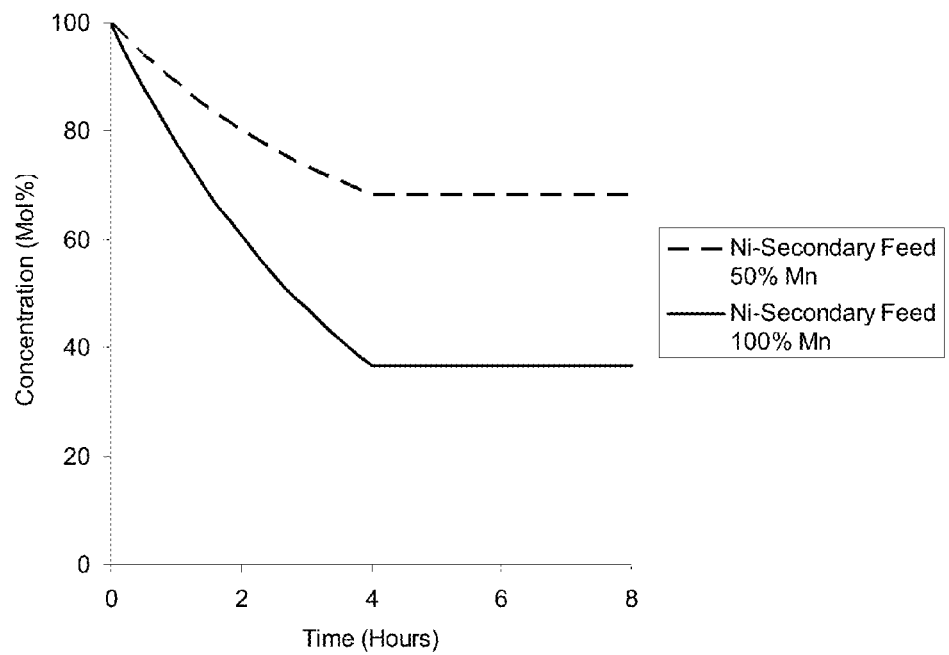
FIG. 7 is a graph of nickel concentration (in mole percent) fed to the chamber as a function of time for concentrations in the secondary manganese-rich solution of 50 mole percent and 100 mole percent of manganese, according to Examples 1 and 5.

The Ni mol % as a function of time for Examples 1 and 5 are shown in FIG. 7. The concentration of the Mn-rich solution was adjusted to tune the Ni concentration in the reactor and subsequently the concentration of Ni in the particles. FIG. 7 shows that the Ni concentration increases from 36.8 mol % to 68.4 mol % when the manganese-rich feed concentration was increased from 0 to 50 mol % of Ni.

Example 7

Figure 8:
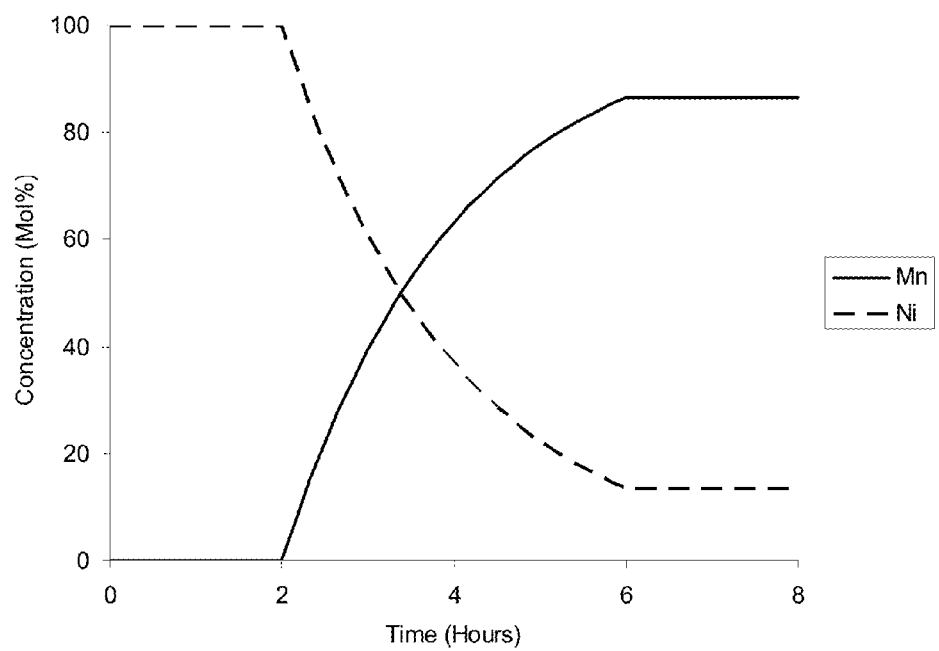
FIG. 8 is a graph of the concentration (in mole percent) of manganese and nickel fed to the chamber as a function of time. The secondary manganese-rich solution was fed to the second container after 2 hours, according to Example 7.

The concentration of Mn and Ni in the reactor as a function of time was determined when 4 L of 100 mol % of Mn was fed at 1 L/hr for 4 hours and mixed with a Ni-rich solution composed of 100 mol % of Ni, after the Ni-rich solution had already been fed to the reactor for 2 hours. The initial volume of the Ni-rich solution was 2 L and it was half the initial volume as compared to Example 1, because the Mn-rich feed is fed 2 hours later than in Example 1. The concentration profile is shown in FIG. 8.

Over the first 2 hours of the process, 100 mol % of Ni was fed to the reactor. The relative Ni concentration dropped from 100 mol % to 13.5 mol %. Correspondingly, the Mn concentration increased from 0 mol % to 86.5 mol % over the 4 hour period from 2 to 6 hours after starting the Ni-rich feed into the reactor. After 6 hours, a solution with a constant concentration of 13.5 mol % of Ni and 86.5 mol % of Mn was fed to the reactor for an additional 2 hours Example 8

Figure 9:
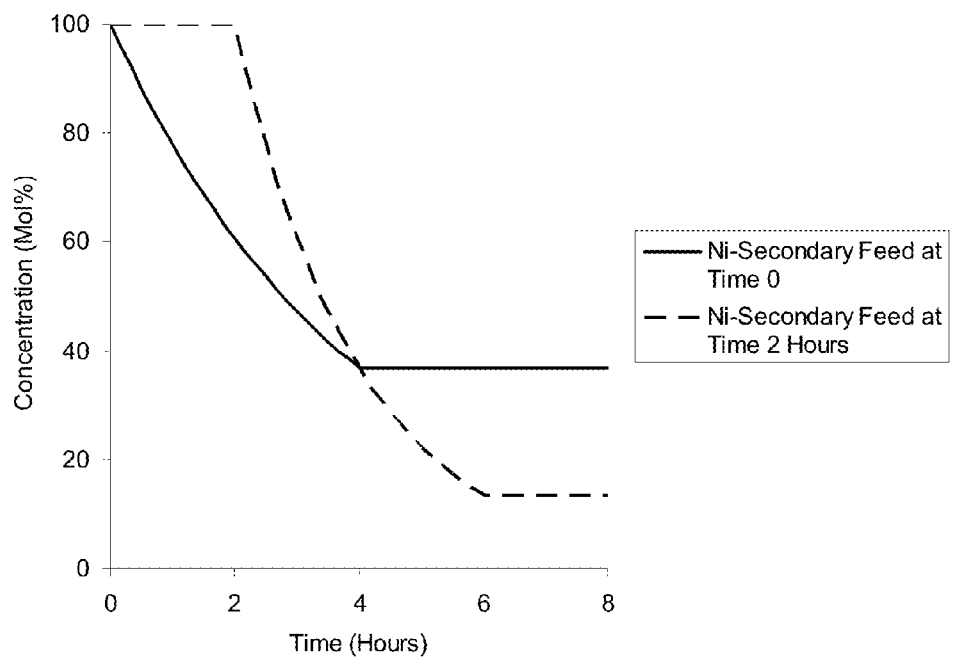
FIG. 9 is a graph of nickel concentration (in mole percent) fed to the chamber as a function of time when the secondary manganese-rich solution begins pumping after 0 and 2 hours, according to Examples 1 and 7.

In Example 1, the Mn-rich feed was fed to the Ni-rich solution at the start of the process (t=0). In contrast, in Example 7, the Mn-rich feed was fed to the Ni-rich solution after the Ni-rich solution has been fed to the reactor for 2 hours. The Ni mol % as a function of time for Examples 1 and 7 are shown in FIG. 9. By delaying the mixing of the Mn-rich, the particles have a Ni core before outer layers with Mn are formed.

Example 9

Figure 10:
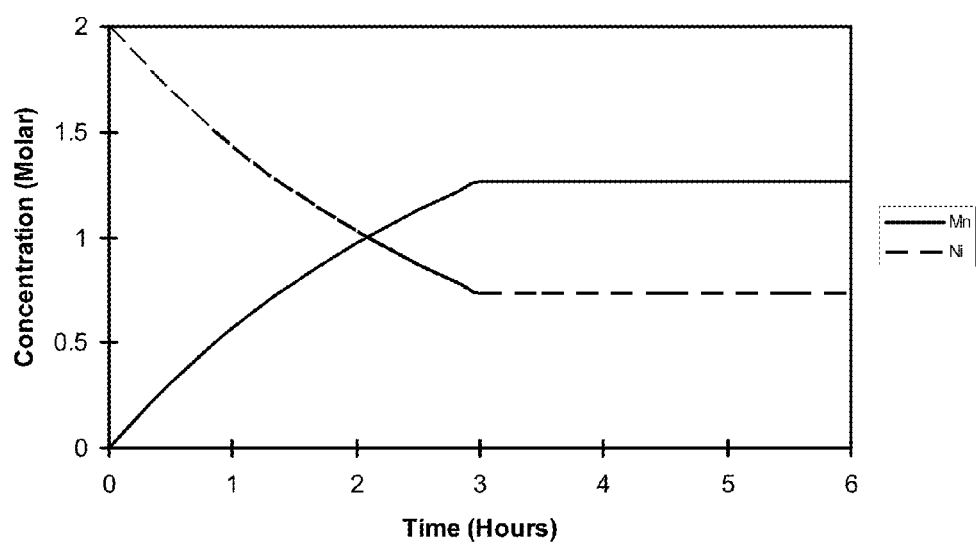
FIG. 10 is a graph of the molar concentration profile of manganese and nickel fed to the chamber as a function of time where the transition metal particles are prepared according to Example 9.

An Mn-rich solution (3 L of 2 M $MnSO_4$) was pumped into the Ni-rich solution (3 L of 2 M $NiSO_4$) to form the transition metal source solution. The transition metal source solution was fed into the reactor. Simultaneously, a second aqueous solution comprised of 2 M $Na_2CO_3$ and 0.2 M $NH_4OH$ was fed to the reactor at a rate that maintained the pH inside the reactor at 8.0. The temperature inside the reactor was kept at 60° C. The process was run for a total of 6 hours. The molar compositions of Mn and Ni fed to the reactor as a function of time is shown in FIG. 10.

Example 10

Figure 11:
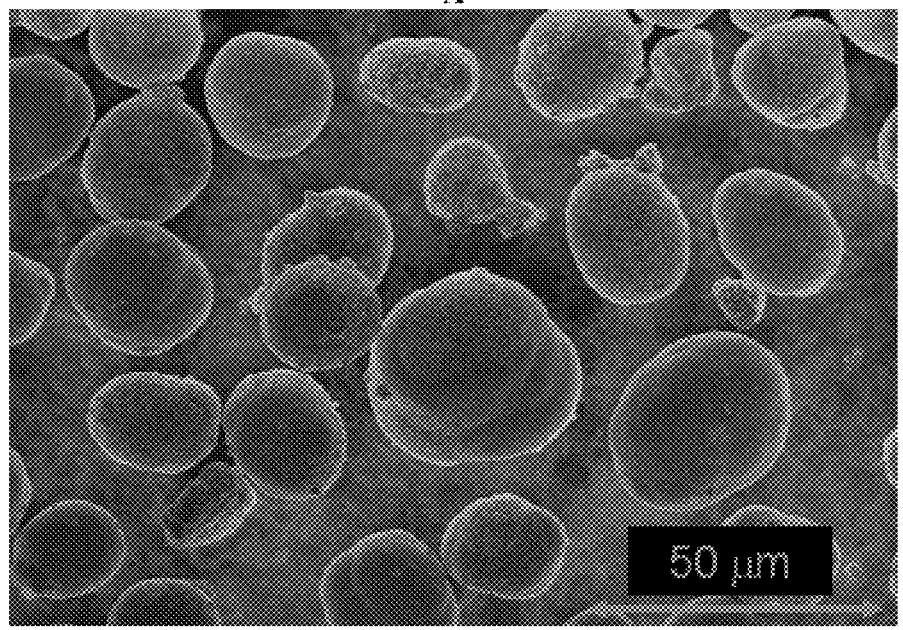
FIG. 11 shows SEM images of the surface morphologies of $Mn_{0.62}Ni_{0.38}CO_3$ particles. The particles were collected from the chamber at the completion of the 6 hour process according to Example 10.
Figure 11:
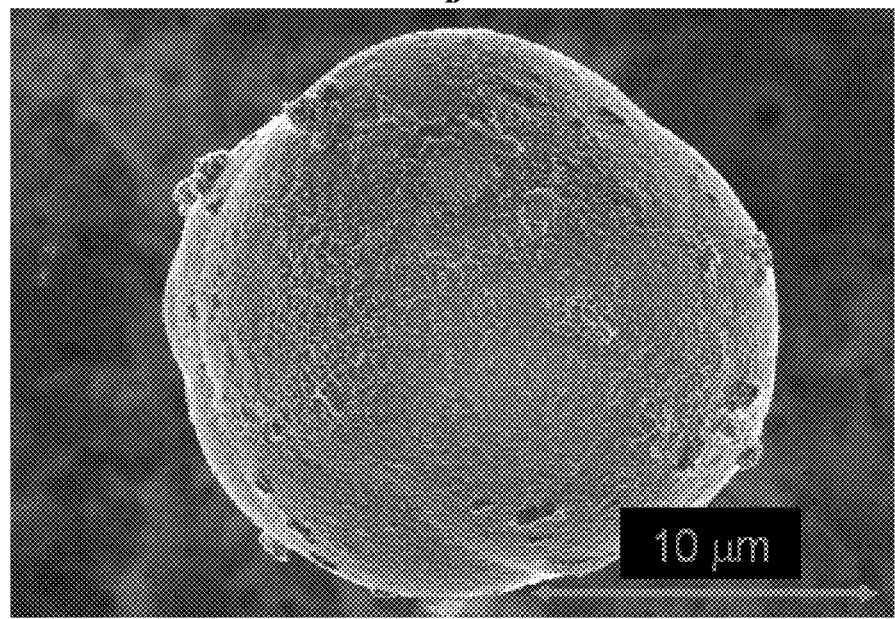
Figure 12:
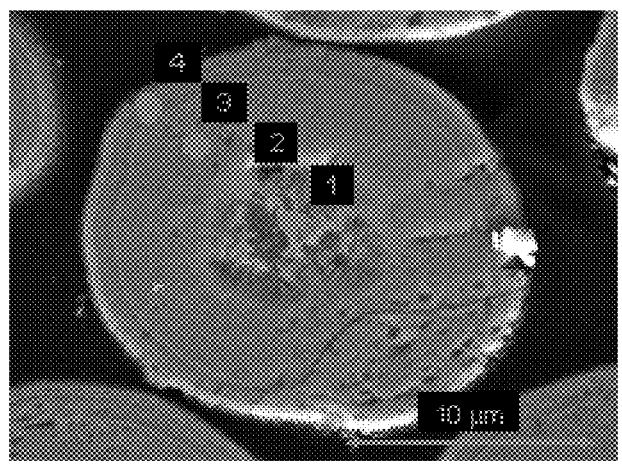
FIG. 12 shows SEM images of the interior cross section of a $Mn_{0.62}Ni_{0.38}CO_3$ transition metal particle that has been microtomed in a supporting resin according to Example 10. EDXS was performed at the points labeled "1", "2", "3", and "4" on the particle interior to determine the relative composition (atomic percentage) of manganese.
Figure 13:
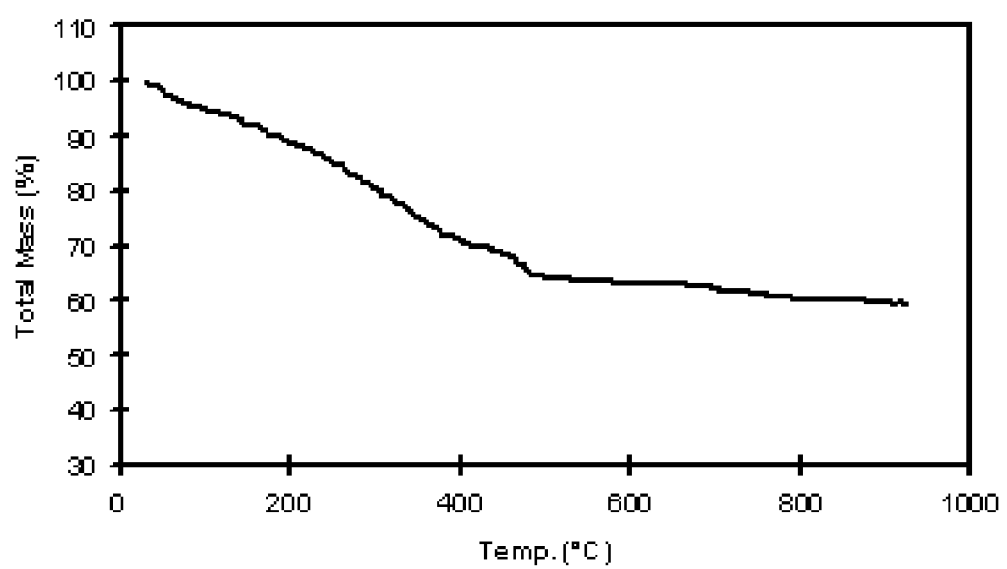
FIG. 13 shows the mass percentage of the $Mn_{0.62}Ni_{0.38}CO_3$ transition metal particles after TGA according to Example 10.
Figure 14:
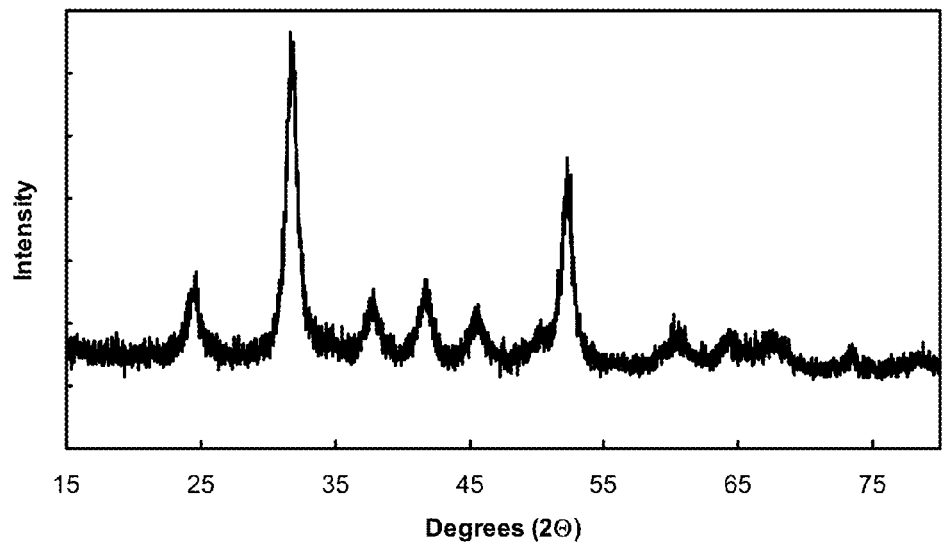
FIG. 14 shows an XRD pattern of the $Mn_{0.62}Ni_{0.38}CO_3$ transition metal particles according to Example 10.

At the end of the 6 hour process described in Example 9, particles were collected from the reactor, thoroughly rinsed with distilled water, filtered, and dried at 100° C. to remove water. Inductively coupled plasma (ICP) analysis confirmed the composition of the material to be, on average, $Mn_{0.62}Ni_{0.38}CO_3$. Scanning electron micrographs (SEMs) of the $Mn_{0.62}Ni_{0.38}CO_3$ material at two different magnifications can be found in FIG. 11. The $Mn_{0.62}Ni_{0.38}CO_3$ particles are approximately spherical with sizes ranging from 10 μM to 40 μm. The material was embedded in a resin and cut with a microtome to reveal the internal morphology and composition of the particles. The SEMs in FIG. 12 and the energy dispersive x-ray spectroscopy (EDXS) was measured at locations "1" through "4" on the particle. The results show that the relative transition metal composition of the particles increases from 27.1% Mn in the core to 62.1% Mn at the surface (Mn+Ni=100%). Thermal gravimetric analysis (TGA) in FIG. 13, and the X-ray diffraction pattern shown in FIG. 14 for the material, are consistent with the majority of the $Mn_{0.62}Ni_{0.38}CO_3$ being comprised of $MnCO_3$-type materials.

Example 11

Figure 15:
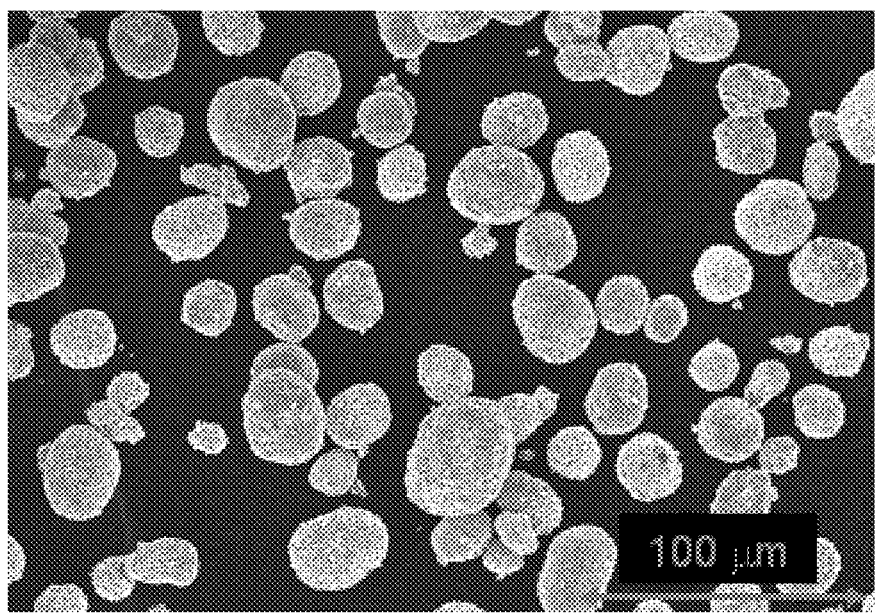
FIG. 15 shows SEM images of the surface morphologies of the $Li_{1.2}(Mn_{0.62}Ni_{0.38})_{0.8}O_2$ material prepared according to Example 11.
Figure 15:
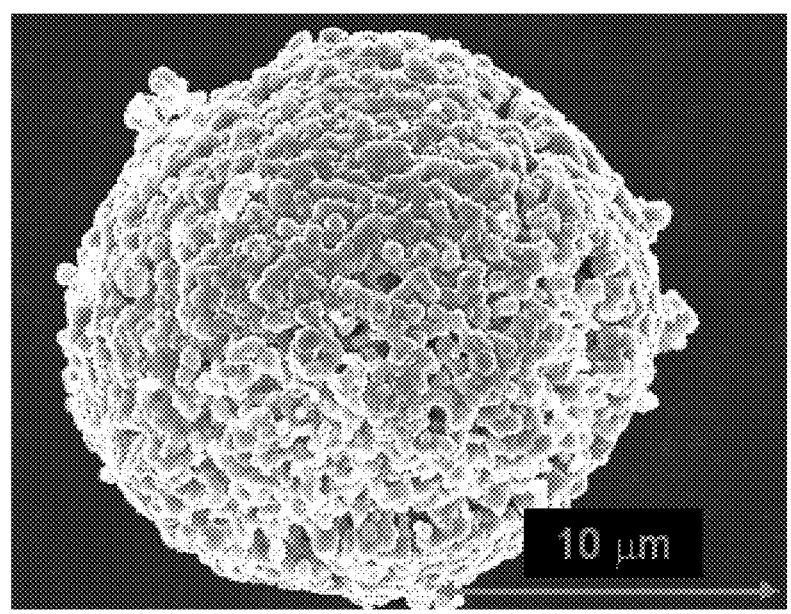
Figure 16:
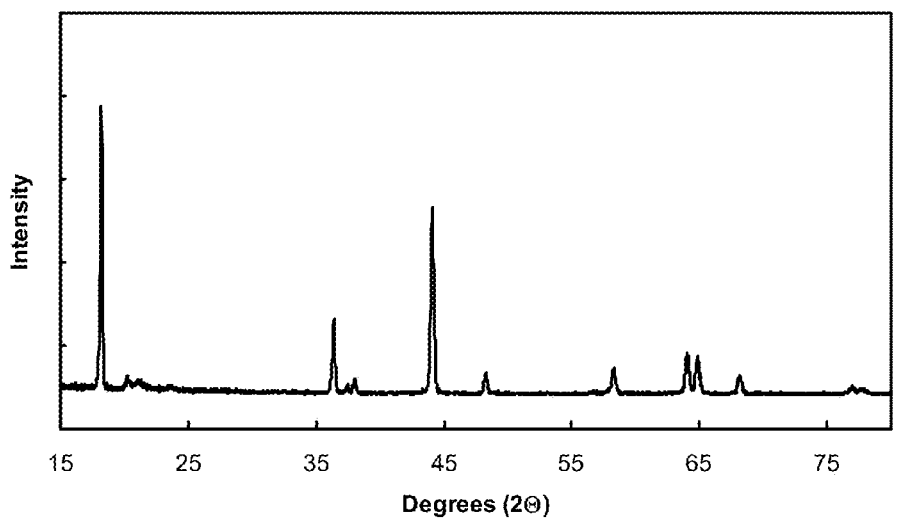
FIG. 16 shows an XRD pattern obtained from the $Li_{1.2}(Mn_{0.62}Ni_{0.38})_{0.8}O_2$ material prepared according to Example 11.

The $Mn_{0.62}Ni_{0.38}CO_3$ material described in Example 10 was fired in a furnace in air at 900° C. with $Li_2CO_3$ at the stoichiometric amount to produce $Li_{1.2}(Mn_{0.62}Ni_{0.38})_{0.8}O_2$. SEM images of the $Li_{1.2}(Mn_{0.62}Ni_{0.38})_{0.8}O_2$ material are shown in FIG. 15 and reveal that the $Li_{1.2}(Mn_{0.62}Ni_{0.38})_{0.8}O_2$ are spherical particles 10 to 40 μm in diameter are composed of smaller primary particles at the surface which are less than 500 nanometers. XRD of the $Li_{1.2}(Mn_{0.62}Ni_{0.38})_{0.8}O_2$ shown in FIG. 16 is consistent with a composite material composed mainly of a $R\bar{3}m$ structure with a minor component that displays a $Li_2MnO_3$-type integrated phase (C2/m space group).

Figure 17:
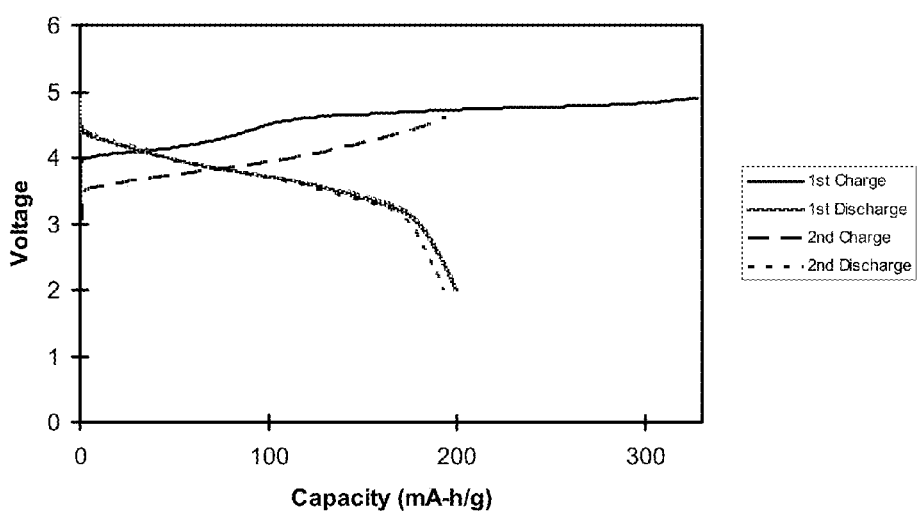
FIG. 17 shows the first and second charge and discharge cycles for the $Li_{1.2}(Mn_{0.62}Ni_{0.38})_{0.8}O_2$ particle. The $Li_{1.2}(Mn_{0.62}Ni_{0.38})_{0.8}O_2$ particles were used as the active cathode component in a $Li|Li_{1.2}(Mn_{0.62}Ni_{0.38})_{0.8}O_2$ cell cycled at a rate of C/10 (1C corresponds to 200 mA/g) according to Example 11.
Figure 18:
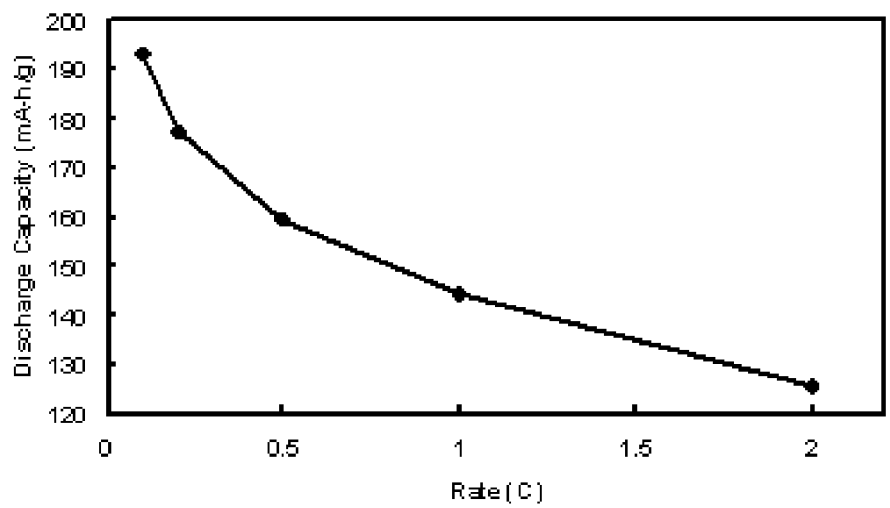
FIG. 18 shows the discharge capacity as a function of the charge/discharge rate for the $Li_{1.2}(Mn_{0.62}Ni_{0.38})_{0.8}O_2$ material used as the active cathode component in a $Li/Li_{1.2}(Mn_{0.62}Ni_{0.38})_{0.8}O_2$ coin cell (1C corresponds to 200 mA/g) according to Example 11.
Figure 19:
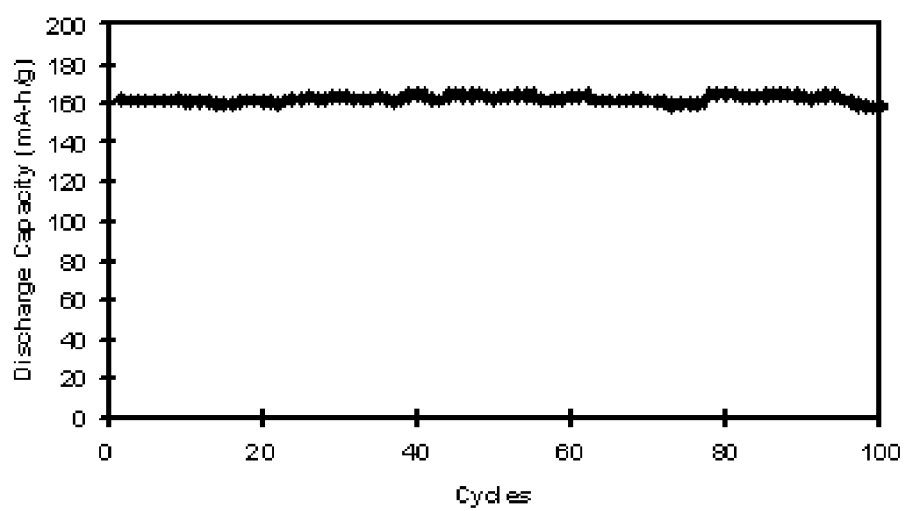
FIG. 19 shows the discharge capacity during 100 cycles of the $Li_{1.2}(Mn_{0.62}Ni_{0.38})_{0.8}O_2$ material used as the active cathode component in a $Li/Li_{1.2}(Mn_{0.62}Ni_{0.38})_{0.8}O_2$ coin cell at a charge/discharge rate of C/2 (1 C corresponds to 200 mA/g) according to Example 11.
Figure 20:
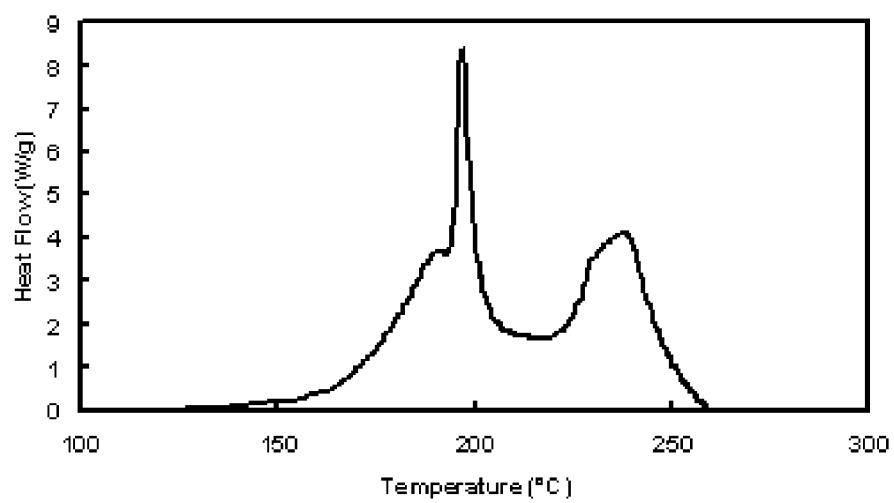
FIG. 20 shows the heat flow as a function of temperature during DSC performed on the $Li_{1.2}(Mn_{0.62}Ni_{0.38})_{0.8}O_2$ material after charging to 4.6 V in a $Li|Li_{1.2}(Mn_{0.62}Ni_{0.38})_{0.8}O_2$ coin cell according to Example 11. The total heat released was 1510 W/g and the onset temperature was 172° C.

Lithium coin cells were fabricated with $Li_{1.2}(Mn_{0.62}Ni_{0.38})_{0.8}O_2$ as the positive electrode, lithium metal as the negative electrode, and 1.2 M $LiPF_6$ in ethylene carbonate and ethyl methyl carbonate solvent mixture as the electrolyte. The cell was charged to 4.9 V and discharge to 2 V on the first cycle and charged to 4.6 V and discharged to 2 V on all subsequent cycles. FIG. 17 shows the first 2 charge/discharge cycles for such coin cells. The initial charging capacity was 327 mAh/g, the initial discharge capacity was 199 mAh/g, the second cycle charging capacity was 194 mAh/g, and the second cycle discharge capacity was 193 mAh/g. FIG. 18 shows the discharge capacity of the $Li_{1.2}(Mn_{0.62}Ni_{0.38})_{0.8}O_2$ cathode material as a function of charge/discharge rate (1C=200 mA/g). FIG. 19 shows the discharge capacity over 100 charge/discharge cycles at C/2 remaining steady at ~160 mAh/g. When charged to 4.6 V, differential scanning calorimetry (DSC) performed on the positive electrodes containing $Li_{1.2}(Mn_{0.62}Ni_{0.38})_{0.8}O_2$ shown in FIG. 20 revealed a total heat release of 1510 W/g and and onset temperature was 172°

C. The DSC provides information relevant to the potential safety attributes of the cathode material.

Example 12

Figure 21:
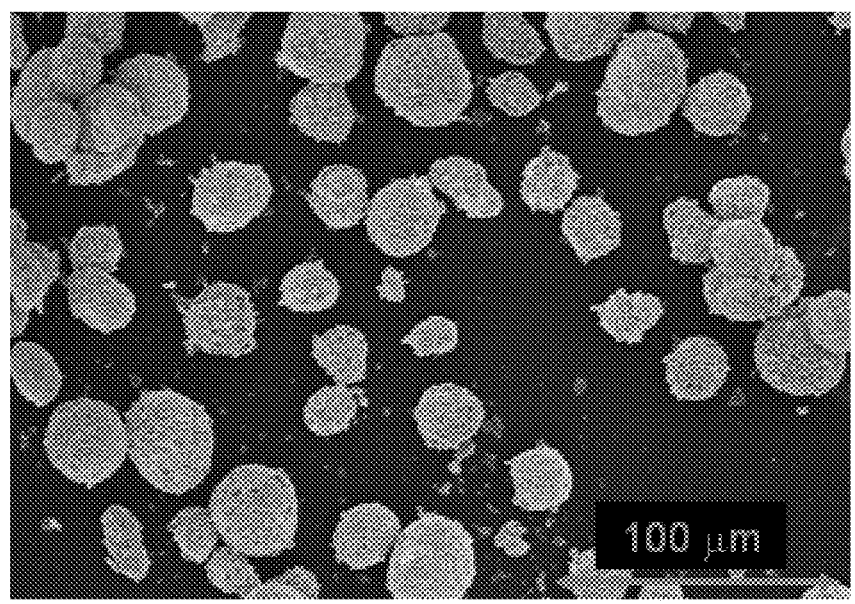
FIG. 21 shows SEM images of the surface morphologies of the $Li_{1.16}(Mn_{0.62}Ni_{0.38})_{0.84}O_2$ material prepared according to Example 12.
Figure 21:
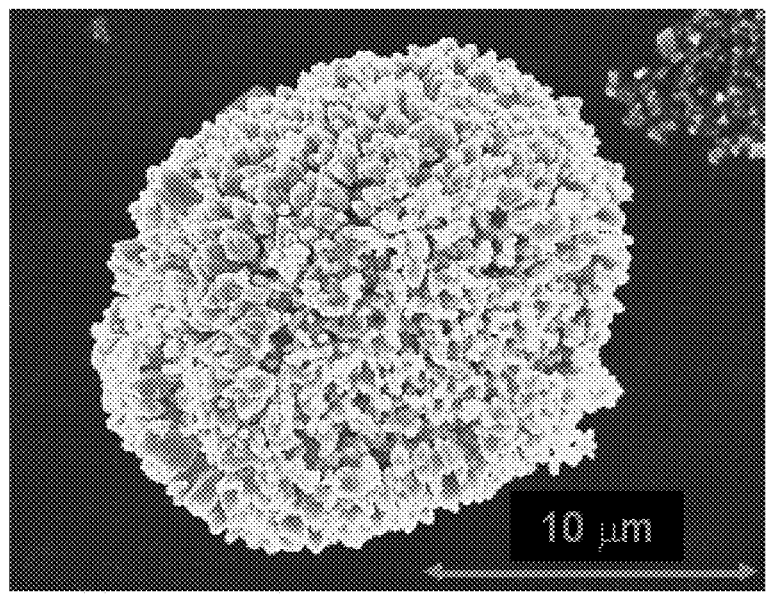
Figure 22:
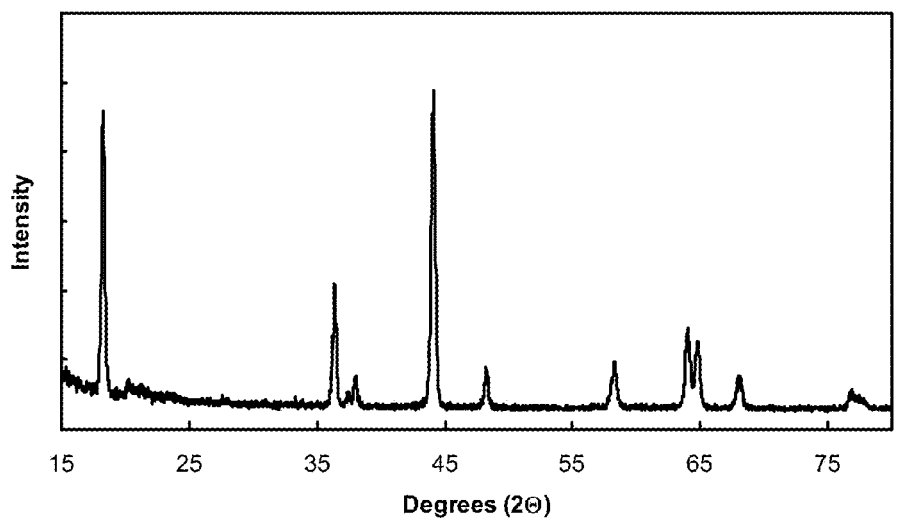
FIG. 22 shows an XRD pattern obtained from the $Li_{1.16}(Mn_{0.62}Ni_{0.38})_{0.84}O_2$ material prepared according to Example 12.

The $Mn_{0.62}Ni_{0.38}CO_3$ material described in Example 10 was fired in a furnace in air at 900° C. with $Li_2CO_3$ at the stoichiometric amount to produce $Li_{1.16}(Mn_{0.62}Ni_{0.38})_{0.84}O_2$. SEM images of the $Li_{1.16}(Mn_{0.62}Ni_{0.38})_{0.84}O_2$ material are shown in FIG. 21 and reveal that the $Li_{1.16}(Mn_{0.62}Ni_{0.38})_{0.84}O_2$ particles are approximately spherical. The particles have a primary/secondary structure, with the larger secondary particles having a diameter of from 10 to 40 μm, that are formed with smaller primary particles having a dimension of less than 500 nm. An XRD pattern of the $Li_{1.16}(Mn_{0.62}Ni_{0.38})_{0.84}O_2$, as shown in FIG. 22, is consistent with a composite material composed mainly of a $R\overline{3}m$ structure with a minor component that displays a $Li_2MnO_3$-type integrated phase (C2/m space group).

Figure 23:
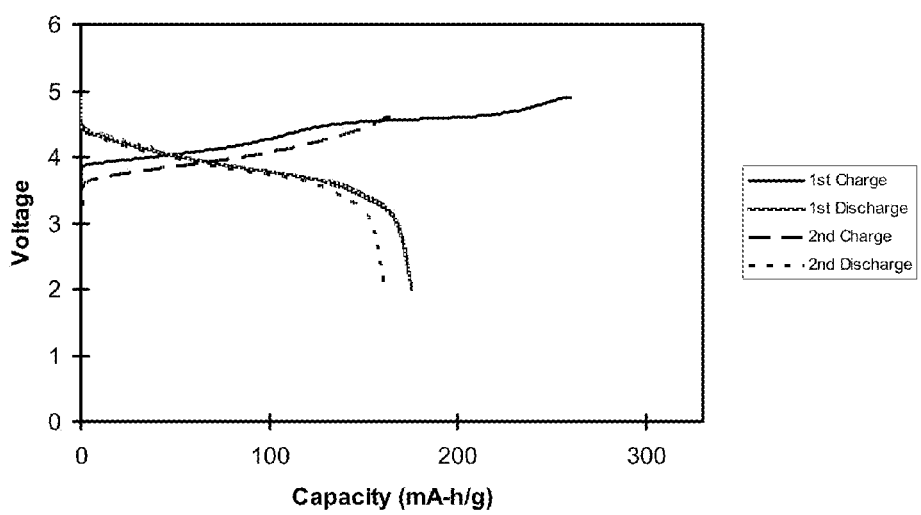
FIG. 23 shows the first and second charge and discharge cycles for the $Li_{1.16}(Mn_{0.62}Ni_{0.38})_{0.84}O_2$ material used as the active cathode component in a $Li|Li_{1.16}(Mn_{0.62}Ni_{0.38})_{0.84}O_2$ coin cell at a rate of C/10 (1C corresponds to 200 mA/g) according to Example 12.
Figure 24:
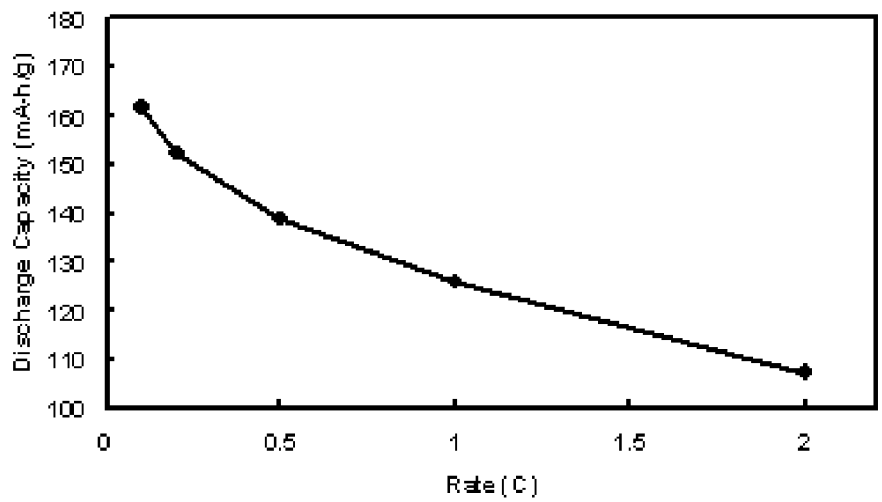
FIG. 24 shows the discharge capacity as a function of the charge/discharge rate for the $Li_{1.16}(Mn_{0.62}Ni_{0.38})_{0.84}O_2$ material used as the active cathode component in a $Li|Li_{1.16}(Mn_{0.62}Ni_{0.38})_{0.84}O_2$ coin cell (1C corresponds to 200 mA/g) according to Example 12.
Figure 25:
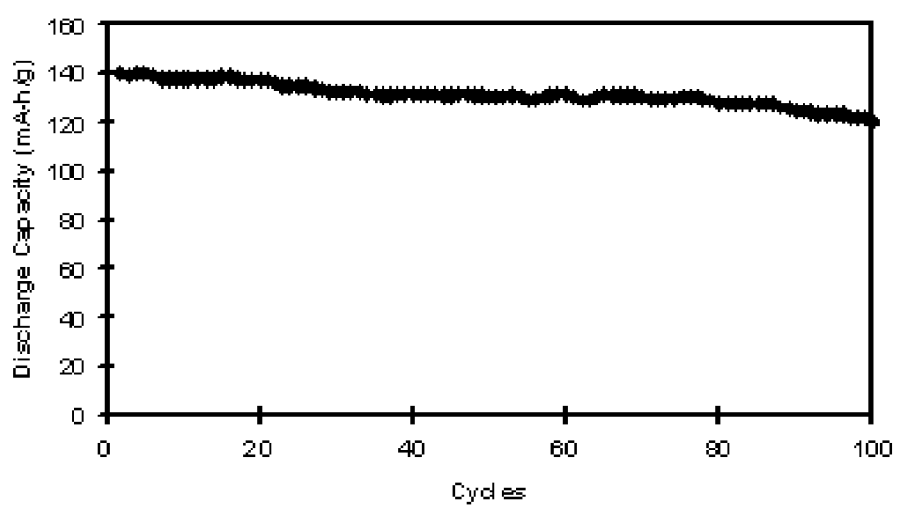
FIG. 25 shows the discharge capacity during 100 cycles of the $Li_{1.16}(Mn_{0.62}Ni_{0.38})_{0.84}O_2$ material used as the active cathode component in a $Li|Li_{1.16}(Mn_{0.62}Ni_{0.38})_{0.84}O_2$ coin cell at a charge/discharge rate of C/2 (1C corresponds to 200 mA/g) according to Example 12.
Figure 26:
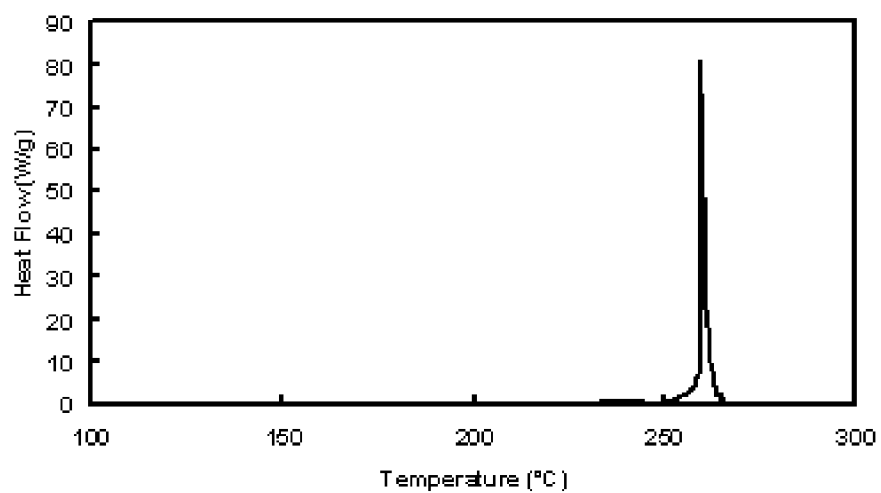
FIG. 26 shows the heat flow as a function of temperature during DSC performed on the $Li_{1.16}(Mn_{0.62}Ni_{0.38})_{0.84}O_2$ material after charging to 4.6 V in a $Li/Li_{1.16}(Mn_{0.62}Ni_{0.38})_{0.84}O_2$ coin cell according to Example 12. The total heat released was 1236 W/g and the onset temperature was 259° C.

Lithium cells were fabricated with $Li_{1.16}(Mn_{0.62}Ni_{0.38})_{0.84}O_2$ as the positive electrode, lithium metal as the negative electrode, and 1.2 M $LiPF_6$ in ethylene carbonate and ethyl methyl carbonate solvent mixture as the electrolyte. The cell was charged to 4.9 V and discharge to 2 V on the first cycle and charged to 4.6 V and discharged to 2 V on all subsequent cycles. FIG. 23 shows the first 2 charge/discharge cycles for one of these coin cells. The initial charging capacity was 260 mAh/g, the initial discharge capacity was 175 mAh/g, the second cycle charging capacity was 165 mAh/g, and the second cycle discharge capacity was 161 mAh/g. FIG. 24 shows the discharge capacity of the $Li_{1.16}(Mn_{0.62}Ni_{0.38})_{0.84}O_2$ cathode material as a function of charge/discharge rate (1C=200 mA/g). FIG. 25 shows the discharge capacity over 100 charge/discharge cycles at C/2. When charged to 4.6 V, DSC performed on the positive electrodes containing $Li_{1.16}(Mn_{0.62}Ni_{0.38})_{0.84}O_2$ shown in FIG. 26 revealed a total heat release of 1236 W/g and an onset temperature of 259° C.

Example 13

$Li_{1.2}(Ni_{0.25}Co_{0.15}Mn_{0.6})_{0.8}O_2$ was prepared by mixing lithium carbonate and $Ni_{0.25}Co_{0.05}Mn_{0.7}CO_3$ material at 900° C. The $(Ni_{0.25}Co_{0.05}Mn_{0.6})CO_3$ particles were prepared according to the general method of this invention.

Figure 27:
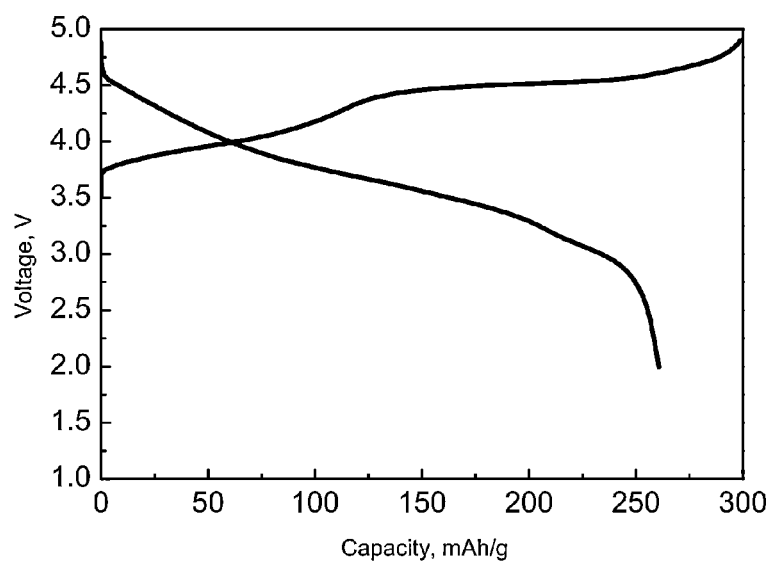
FIG. 27 shows the first charge and discharge capacity for $Li_{1.2}(Ni_{0.25}Co_{0.15}Mn_{0.6})_{0.8}O_2$ material used as the active cathode component in a $Li|Li_{1.2}(Mn_{0.6}Ni_{0.25}Co_{0.15})_{0.8}O_2$ coin cell at a rate of C/10 (1C corresponds to 200 mA/g) according to Example 13.
Figure 28:
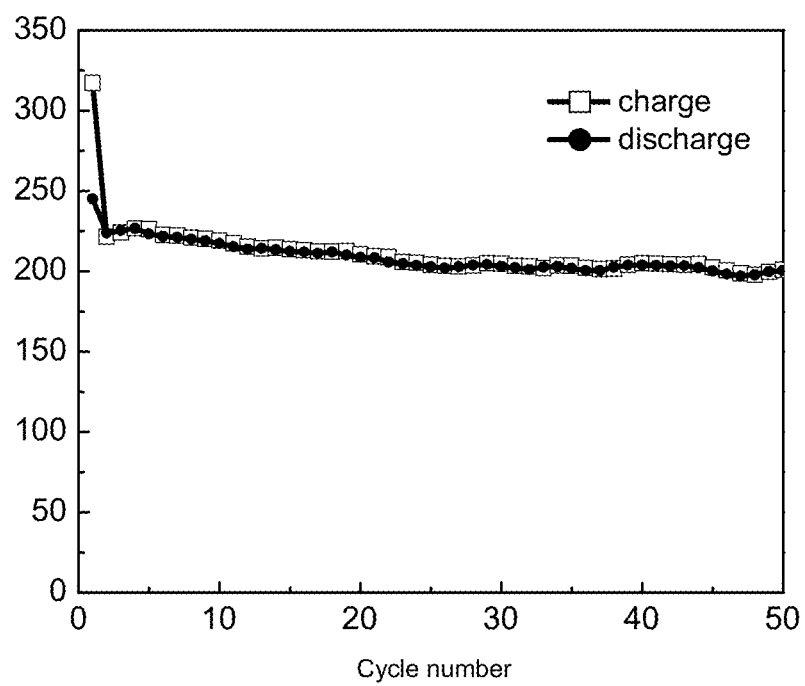
FIG. 28 shows the charge and discharge capacity during 50 cycles of the $Li_{1.2}(Ni_{0.25}Co_{0.15}Mn_{0.6})_{0.8}O_2$ material used as the active cathode component in a $Li|Li_{1.2}(Ni_{0.25}Co_{0.15}Mn_{0.6})_{0.8}O_2$ coin cell at a charge/discharge rate of C/5 (1C corresponds to 200 mA/g) according to Example 13.

A lithium cell was fabricated with $Li_{1.2}(Ni_{0.25}Co_{0.15}Mn_{0.6})_{0.8}O_2$ as the positive electrode, Li metal as the negative electrode, and 1.2 M $LiPF_6$ in ethylene carbonate and ethyl methyl carbonate solvent mixture as the electrolyte. The cell was charged to 4.9 V and discharge to 2 V. FIG. 27 shows the voltage profiles of the first charge/discharge cycle for $Li_{1.2}(Ni_{0.25}Co_{0.15}Mn_{0.6})_{0.8}O_2$ under the C/10 rate. At the top of the charge, the capacity of the material was 300 mAh/g. The first charge capacity above the plateau region at 4.5 V was 170 mAh/g. The discharge capacity of the material was 261 mAh and hence the coulombic efficiency was 87%. FIG. 28 displays the capacity of the charge and discharge with cycling. Over 200 mAh/g capacity was observed for the first 50 cycles.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A process comprising:
   dissolving a first transition metal compound in a solvent to form a first transition metal solution and dissolving a second transition metal compound in a solvent to form a second transition metal solution;
   flowing the first transition metal solution into the second transition metal solution to form a transition metal source solution;
   contacting the transition metal source solution with a precipitating agent to form a precursor solution; and precipitating from the precursor solution a precipitated particle, the precipitated particle having a radius and a transition metal oxide core;
wherein:
the concentration of the first transition metal compound in the transition metal source solution and the concentration of the second transition metal compound in the transition metal source solution change with time; and
the precipitated particles have a transition metal gradient in which the ratio of the first transition metal to the second transition metal is inversely proportional to the radius of the particle over at least a portion of the radius.

2. The process of claim 1, wherein the contacting comprises stirring.

3. The process of claim 1, wherein a transition metal of the first transition metal compound is manganese, cobalt, nickel, chromium, vanadium, aluminum, zinc, sodium, titanium, or iron and a transition metal of the second transition metal compound is manganese, cobalt, nickel, chromium, vanadium, aluminum, zinc, sodium, titanium, or iron.

4. The process of claim 1, wherein the first transition metal compound is manganese sulfate, nickel sulfate, cobalt sulfate, manganese nitrate, nickel nitrate, cobalt nitrate, manganese chloride, nickel chloride, cobalt chloride, manganese acetate, nickel acetate, cobalt acetate, manganese citrate, nickel citrate, or cobalt citrate and the second transition metal compound is manganese sulfate, nickel sulfate, cobalt sulfate, manganese nitrate, nickel nitrate, cobalt nitrate, manganese chloride, nickel chloride, cobalt chloride, manganese acetate, nickel acetate, cobalt acetate, manganese citrate, nickel citrate, or cobalt citrate.

5. The process of claim 1, wherein:
the first transition metal compound comprises manganese and the second transition metal compound comprises cobalt;
the first transition metal compound comprises manganese and the second transition metal compound comprises nickel;
the first transition metal compound comprises cobalt and the second transition metal compound comprises nickel;
the first transition metal compound comprises nickel and the second transition metal compound comprises manganese;
the first transition metal compound comprises nickel and the second transition metal compound comprises cobalt; or
the first transition metal compound comprises cobalt and the second transition metal compound comprises nickel.

6. The process of claim 1, wherein the precipitating agent comprises sodium carbonate, sodium hydroxide, potassium carbonate, potassium hydroxide, lithium carbonate, or lithium hydroxide.

7. The process of claim 1 further comprising contacting the precursor solution with a chelating agent prior to precipitating.

8. The process of claim 7, wherein the chelating agent comprises ammonium hydroxide, hydrazine, or ethylenediaminetetraacetic acid.

9. The process of claim 1 further comprising:
dissolving a third transition metal compound in a solvent to form a third transition metal solution; and
flowing the third transition metal solution into the transition metal source solution.

10. The process of claim 9, wherein the transition metal of the third transition metal compound is manganese, cobalt, or nickel.

11. The process of claim 9, wherein the third transition metal compound is manganese sulfate, nickel sulfate, cobalt sulfate, manganese nitrate, nickel nitrate, or cobalt nitrate.

12. The process of claim 1, wherein a concentration of a first transition metal in the first transition metal solution is from 0.001 M to 6 M.

13. The process of claim 1, wherein a concentration of a second transition metal in the second transition metal solution is from 0.001 M to 6 M.

14. The process of claim 1, wherein the solvent comprises water or an alcohol.

15. The process of claim 1 further comprising collecting the particles.

16. The process of claim 1 further comprising contacting the particles with lithium.

17. The process of claim 1 further comprising heating the particles at elevated temperature.

18. An electrochemical device comprising a particle prepared by the process of claim 1.

19. The process of claim 1, wherein the transition metal gradient correlates with the change in concentrations of the first and second transition metal compounds in the transition metal source solution.

* * * * *

UNITED STATES PATENT AND TRADEMARK OFFICE
CERTIFICATE OF CORRECTION

| | | |
|---|---|---|
| PATENT NO. | : 8,591,774 B2 | Page 1 of 1 |
| APPLICATION NO. | : 12/895349 | |
| DATED | : November 26, 2013 | |
| INVENTOR(S) | : Gary M. Koenig, Jr. | |

It is certified that error appears in the above-identified patent and that said Letters Patent is hereby corrected as shown below:

Title Page

Under Item (75) Inventors after the fourth listed inventor, on the next line, insert additional inventor --Yang-Kook Sun, Seoul, Korea (KR)--.

Signed and Sealed this
Fourteenth Day of July, 2015

Michelle K. Lee
*Director of the United States Patent and Trademark Office*